(12) United States Patent
Moganty et al.

(10) Patent No.: US 12,525,649 B2
(45) Date of Patent: Jan. 13, 2026

(54) CYCLIC SULFONE ADDITIVES FOR LITHIUM ION BATTERIES

(71) Applicant: SIONIC ENERGY, INC., Rochester, NY (US)

(72) Inventors: Surya S. Moganty, Henrietta, NY (US); Rutvik Vaidya, Rochester, NY (US); John Sinicropi, Rochester, NY (US)

(73) Assignee: SIONIC ENERGY, INC., Rochester, NY (US)

( * ) Notice: Subject to any disclaimer, the term of this patent is extended or adjusted under 35 U.S.C. 154(b) by 489 days.

(21) Appl. No.: 18/029,125

(22) PCT Filed: Mar. 31, 2021

(86) PCT No.: PCT/US2021/025136
§ 371 (c)(1),
(2) Date: Mar. 29, 2023

(87) PCT Pub. No.: WO2022/071987
PCT Pub. Date: Apr. 7, 2022

(65) Prior Publication Data
US 2023/0378534 A1    Nov. 23, 2023

Related U.S. Application Data

(60) Provisional application No. 63/084,911, filed on Sep. 29, 2020.

(51) Int. Cl.
| | | |
|---|---|---|
| *H01M 10/0567* | (2010.01) | |
| *C07D 335/02* | (2006.01) | |
| *H01G 11/50* | (2013.01) | |
| *H01G 11/52* | (2013.01) | |
| *H01G 11/62* | (2013.01) | |
| *H01G 11/64* | (2013.01) | |
| *H01M 10/0525* | (2010.01) | |
| H01G 9/20 | (2006.01) | |

(52) U.S. Cl.
CPC ...... *H01M 10/0567* (2013.01); *C07D 335/02* (2013.01); *H01G 11/50* (2013.01); *H01G 11/52* (2013.01); *H01G 11/62* (2013.01); *H01G 11/64* (2013.01); *H01M 10/0525* (2013.01); *H01G 9/2013* (2013.01); *H01M 2300/0025* (2013.01)

(58) Field of Classification Search
None
See application file for complete search history.

(56) References Cited

U.S. PATENT DOCUMENTS

| | | |
|---|---|---|
| 2005/0219678 A1 | 10/2005 | Lenhard et al. |
| 2012/0100436 A1 | 4/2012 | Inoue et al. |
| 2012/0321964 A1 | 12/2012 | Hasegawa et al. |
| 2020/0036040 A1 | 1/2020 | Takai et al. |

FOREIGN PATENT DOCUMENTS

| | | |
|---|---|---|
| EP | 3 667 802 A1 | 6/2020 |
| EP | 3 706 228 A1 | 9/2020 |

OTHER PUBLICATIONS

European Patent Application No. 21876139.3 Search Report dated Apr. 7, 2025, 11 pages.
M. R. Detty et al., "Electron Transport in 4H-1, 1-Dioxo-4-(dicyanomethylidene) thiopyrans. Investigation of X-ray Structures of Neutral Molecules, Electrochemical Reduction to the Anion Radicals, and Absorption Properties and EPR Spectra of the Anion Radicals", The Journal of Organic Chemistry, vol. 60, No. 6, Mar. 1, 1995, 12 pages.
International Search Report and Written Opinion for International Patent Application No. PCT/US21/25136 (mailed Jul. 8, 2021).

*Primary Examiner* — Carlos Barcena
(74) *Attorney, Agent, or Firm* — Cozen O'Connor

(57) ABSTRACT

Cyclic sulfone organic compounds and an electrolyte containing the cyclic sulfone organic compounds suitable for use in electrochemical energy storage devices useful for reducing battery resistance, increasing cycle life, and improving high-temperature performance are disclosed.

24 Claims, 6 Drawing Sheets

CYCLIC SULFONE ADDITIVES FOR LITHIUM ION BATTERIES

CROSS REFERENCE

This application claims the benefit of the filing date of U.S. Provisional Patent Application No. 63/084,911, filed Sep. 29, 2020, which is hereby incorporated by reference in its entirety.

FIELD

The present disclosure relates to cyclic sulfone functionalized organic compounds that are useful for reducing battery resistance growth, increasing cycle life, improving high-temperature performance; an electrolyte containing the cyclic sulfone organic compounds; and an electrochemical energy storage device containing the electrolyte.

BACKGROUND

Li-ion batteries are heavily used in consumer electronics, electric vehicles (EVs), as well as energy storage systems (ESS) and smart grids. However, the stability of the cathode materials at high potentials reduces due to increased oxidation. This may result in electrochemical oxidation of the material to produce gases, and that can deteriorate the performance of the battery. The cathode active material, which is capable of intercalating/deintercalating lithium ions may dissolve in the non-aqueous electrolyte, resulting in a structural breakdown of the material, and will lead to an increase in the interfacial resistance. These Li-ion batteries are also typically exposed to extreme temperatures during their operation. The SEI (Solid Electrolyte Interface) layer formed on the anode is gradually broken down at high temperatures, and hence leads to more irreversible reaction resulting in capacity loss. Similarly, the CEI (Cathode Electrolyte Interface) will also lose stability at elevated temperatures due to reaction with electrolyte components. These reactions happen on the positive and negative electrode during cycling but are generally more severe at higher temperatures due to faster kinetics. The next generation Li-ion batteries used in consumer electronics, EVs, and ESS will require significant improvements in the electrolyte component relative to the current state-of-the art of Li-ion batteries.

The shuttling of positive and negative ions between the battery electrodes is the main function of the electrolyte. Historically, researchers have focused on developing battery electrodes, and electrolyte development has been limited. Traditional Li-ion batteries used carbonate-based electrolytes with a large electrochemical window, that can transport lithium ions. These electrolytes need functional additives to passivate the anode and form a stable SEI, as well as additives for stabilizing the cathode.

As the industry moves towards higher energy cathode materials for higher energy batteries, stable, efficient, and safe cycling of batteries in wide voltage windows is necessary. Li-ion battery electrolytes can be tuned based on their applications by addition of different co-solvents and additives. This tunability has enabled the development of different additives for high voltage stability and safety of Li-ion cells. Another aspect of high-voltage Li-ion battery electrolyte development is design and optimization of additives that stabilize the cathode by polymerizing to form a CEI. Development of such additives can enable higher energy cathode materials, and therefore improve the energy storage capabilities of Li-ion cells.

Another aspect of Li-ion electrolyte additive development is enabling faster formation by forming a stable SEI film at lower voltages. In conventional Li-ion batteries, slow formation is needed to enable formation of a stable anode SEI, and hence cell formation is one of the time-intensive processes in battery manufacturing. Hence, additives that react at low voltages on conventional Li-ion battery anode materials are a key to enabling Li-ion battery manufacturing with enormous time savings.

Herein, cyclic sulfone organic compounds are reported as multi-functional additives for Li-ion batteries. Molecules with these functional groups as electrolyte additives allow for the formation of a robust SEI during the formation cycle that protects the anode. The functional groups in the molecular structure also protect the cathode from decomposition at high temperatures and voltages. The cell with this additive in the electrolyte would enable safe, long cycle life, and high energy lithium ion batteries.

Cyclic sulfone functionalized organic compounds are described by Detty et al (J. Org. Chem. 1995, 60, 6, 1674-1685) as useful electron transport materials. U.S. Pat. Nos. 8,119,292 and 9,905,325 to LG Chem. teach us the use of sultone-based molecules in battery electrolytes useful for cycle life and high temperature storage applications. U.S. Pat. Nos. 9,437,901 B2, 9,847,549 B2 and 9,660,295 B2 to Samsung SDI teach the use of select nitrile substituted phosphates for battery electrolytes. Hence, there is a need to combine these functionalities in an electrolyte additive for application in electrochemical energy storage devices, especially batteries.

SUMMARY

In accordance with one aspect of the present disclosure, there is provided an electrolyte for an electrochemical energy storage device, the electrolyte includes: a cyclic sulfone organic compound additive; an aprotic organic solvent system; and a metal salt.

In accordance with another aspect of the present disclosure, there is provided an electrolyte for an electrochemical energy storage device, the electrolyte includes: a cyclic sulfone organic compound additive; an aprotic organic solvent system; a metal salt; and at least one additional additive.

In accordance with another aspect of the present disclosure, there is provided an electrochemical energy storage device, including: a cathode; an anode; a separator and an electrolyte including a cyclic sulfone organic compound additive, an aprotic organic solvent system, and a metal salt.

In accordance with another aspect of the present disclosure, there is provided an electrolyte for an electrochemical energy storage device, the electrolyte includes: a cyclic sulfone organic compound additive; an aprotic organic solvent system; a metal salt; and at least one additional additive; wherein the aprotic organic solvent includes open-chain or cyclic carbonate, carboxylic acid ester, nitrite, ether, sulfone, sulfoxide, ketone, lactone, dioxolane, glyme, crown ether, siloxane, phosphoric acid ester, phosphite, mono- or polyphosphazene or mixtures thereof.

In accordance with another aspect of the present disclosure, there is provided an electrolyte for an electrochemical energy storage device, the electrolyte includes: a cyclic sulfone organic compound additive; an aprotic organic solvent system; a metal salt; and at least one additional additive; wherein the cation of the metal salt is aluminum, magnesium or an alkali metal, such as lithium or sodium.

In accordance with another aspect of the present disclosure, there is provided an electrolyte for an electrochemical energy storage device, the electrolyte includes: a cyclic sulfone organic compound additive; an aprotic organic solvent system; a metal salt; and at least one additional additive; wherein the additional additive contains a compound containing at least one unsaturated carbon-carbon bond, carboxylic acid anhydride, sulfur-containing compound, phosphorus-containing compounds boron-containing compound, silicon-containing compound or mixtures thereof.

In accordance with another aspect of the present disclosure, there is provided an electrochemical energy storage device electrolyte including:
an aprotic organic solvent system;
a metal salt; and
at least one cyclic sulfone organic compound additive according to the molecular structure below:

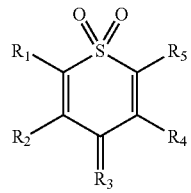

wherein:
$R_3$ is an electron withdrawing group, or a $C_1$-$C_{12}$ linear or branched, alkyl group where at least one hydrogen is substituted with an electron withdrawing group; and
$R_1$, $R_2$, $R_4$, $R_5$ are each independently hydrogen, $C_1$-$C_{12}$ linear or branched, substituted or unsubstituted alkyl and fluoroalkyl groups, or $C_6$-$C_{14}$ aryl groups wherein the hydrogen atoms can be unsubstituted or can be a halogen, alkyl, alkoxy, perfluorinated alkyl, silyl, siloxy, silane, sulfoxide, amide, azo, ether, and thioether group or combinations thereof.

In accordance with another aspect of the present disclosure, there is provided an electrochemical energy storage device including a cathode; an anode; an electrolyte disclosed herein; and a separator.

These and other aspects of the present disclosure will become apparent upon a review of the following detailed description and the claims appended thereto.

DETAILED DESCRIPTION

Figure 1:
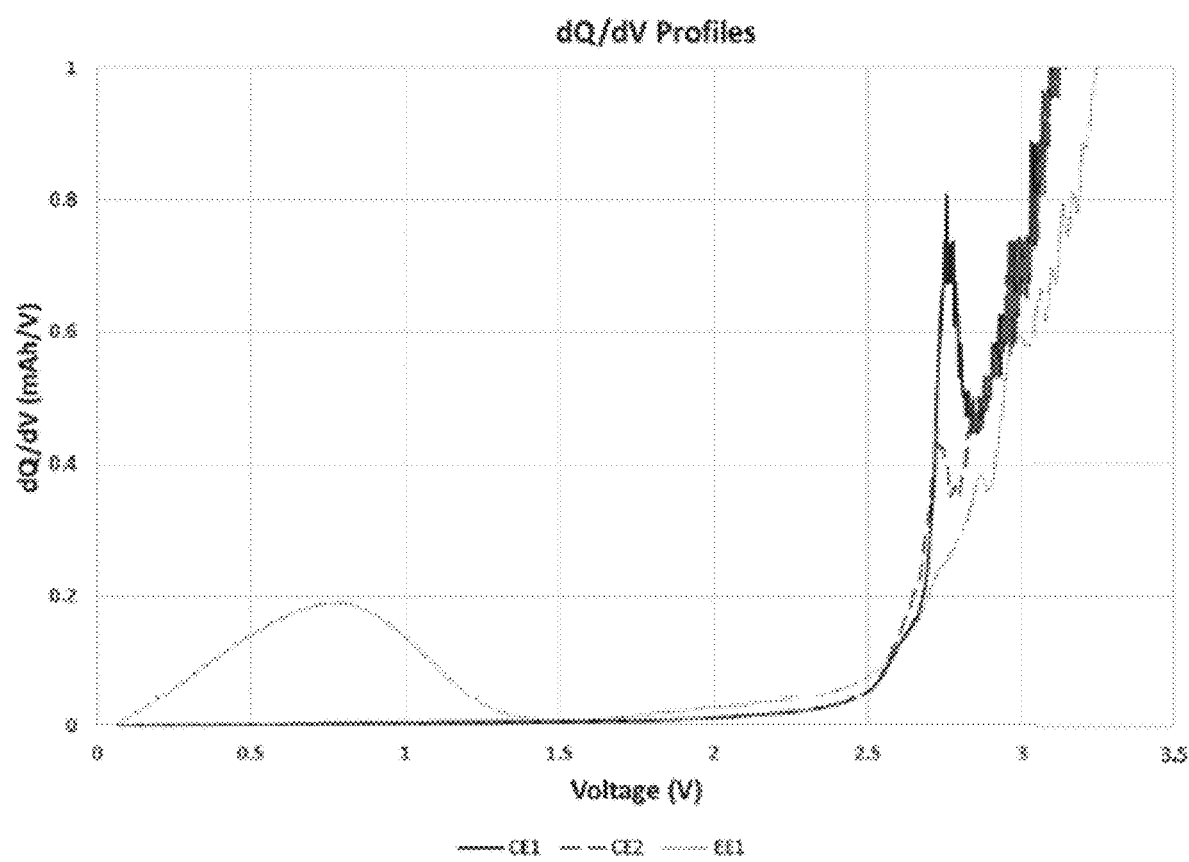
FIG. 1 is a graph showing the dQ/dV profiles of electrolytes tested in NMC811/Gr cells in accordance with the present disclosure.

The disclosed technology relates generally to lithium-ion (Li-ion) battery electrolytes. Particularly, the disclosure is directed towards a cyclic sulfone organic compound, electrolytes containing the cyclic sulfone organic compounds as additive materials, and electrochemical energy storage devices containing the electrolytes.

The present disclosure describes a Li-ion battery electrolyte with an electrolyte additive that can overcome anode stability challenges in Li-ion batteries. There is a need to find additives that passivate the anode materials in Li-ion batteries to form a stable and robust SEI film. Also, current state-of-the-art Li-ion batteries include cathode materials that are low in nickel content and operate at high voltage or have high nickel content but operate at a low voltage. State-of-the-art electrolytes are tuned towards these conditions, and researchers have recently started focusing on enabling high nickel, high voltage battery cathodes with novel electrolyte formulations. There is a need to develop an electrolyte solution for cycling of Li-ion cells with high voltage, high nickel cathodes. The present technology is based on an innovative additive including cyclic sulfone organic compounds, that can form a SEI film on the anode surface and can improve the stability of high-voltage, high-energy cathodes. The electrolyte additives form a unique CEI and do not excessively passivate the cathode, when used at low weight loadings. Additionally, an improved CEI improves the high temperature performance and storage stability, with no effect at room temperature.

In an embodiment, an electrochemical energy storage device electrolyte includes a) an aprotic organic solvent system; b) a metal salt; c) a cyclic sulfone organic compound material additive and d) at least one additional additive.

In an aspect of the disclosure, the molecular structure of cyclic sulfone organic compound additives is depicted below:

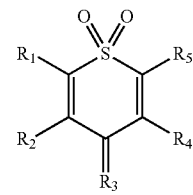

wherein:
$R_3$ is an electron withdrawing group, or a $C_1$-$C_{12}$ linear or branched, alkyl group where at least one hydrogen is substituted with an electron withdrawing group; and
$R_1$, $R_2$, $R_4$, $R_5$ are each independently hydrogen, $C_1$-$C_{12}$ linear or branched, substituted and unsubstituted alkyl and fluoroalkyl groups, or $C_6$-$C_{14}$ aryl groups wherein the hydrogen atoms can be unsubstituted or can be a halogen, alkyl, alkoxy, perfluorinated alkyl, silyl, siloxy, silane, sulfoxide, amide, azo, ether, and thioether group or combinations thereof.

Examples of an electron withdrawing group include but are not limited to halogen, cyano, carbonyl, sulfonyl, nitro, or haloalkyl groups.

Specific examples of molecules according to the disclosure are listed below: 4H-1,1-dioxo-2,6-di(phenyl)-4-(dicyanomethylidene)thiopyran; 4H-1,1-dioxo-2,6-di(4-fluorophenyl)-4-(dicyanomethylidene)thiopyran; 4H-1,1-dioxo-2-phenyl-6-(4-methylphenyl)-4-(dicyanomethylidene) thiopyran; 4H-1,1-dioxo-2,6-di(4-trifluoromethylphenyl)-4-(dicyanomethylidene)thiopyran; 4H-1,1-dioxo-2,6-di(2-thienyl)-4-(dicyanomethylidene)thiopyran.

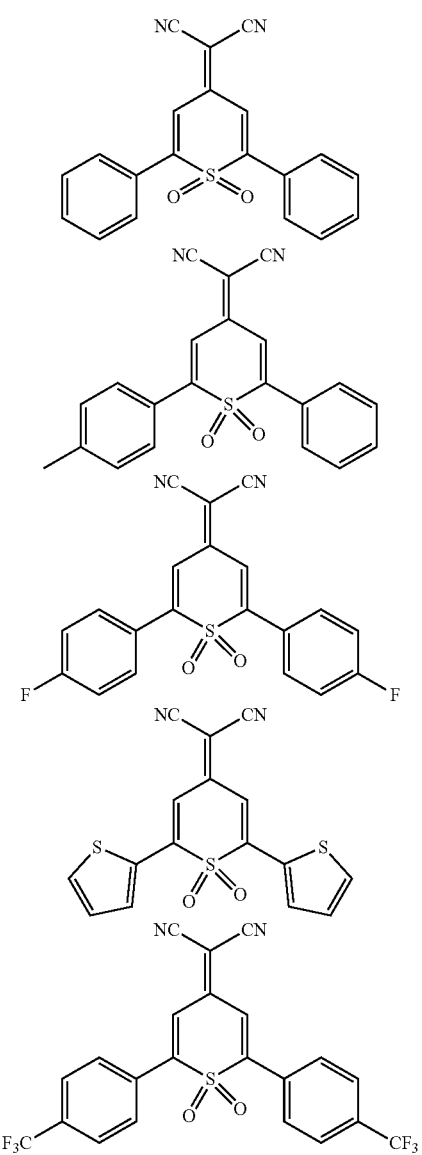

These examples are only an illustration and are not meant to limit the disclosure or claims to follow.

The addition of cyclic sulfone organic compounds into the Li-ion battery system allows for the ring polymerization of the molecule during SEI formation. This reaction happens at a low voltage compared to conventional Li-ion battery additives. The substituent electron withdrawing groups in the molecule also coordinate with the transition metals in the cathode material, which suppresses further oxidative decomposition of the rest of the electrolyte components that occurs otherwise in contact with the cathode material.

The disclosure also includes a method for synthesizing the cyclic sulfone organic compounds, and the use of such molecules in lithium ion battery electrolytes. These molecules form a stable SEI film on the anode and impart greater stability to the cathodes operating at higher potentials.

In an aspect of the disclosure, the electrolyte further includes a lithium salt in a range of from 10% to 30% by weight. A variety of lithium salts may be used, including, for example, $Li(AsF_6)$; $Li(PF_6)$; $Li(CF_3CO_2)$; $Li(C_2F_5CO_2)$; $Li(CF_3SO_3)$; $Li[N(CP_3SO_2)_2]$; $Li[C(CF_3SO_2)_3]$; $Li[N(SO_2C_2F_5)_2]$; $Li(ClO_4)$; $Li(BF_4)$; $Li(PO_2F_2)$; $Li[PF_2(C_2O_4)_2]$; $Li[PF_4C_2O_4]$; lithium alkyl fluorophosphates; $Li[B(C_2O_4)_2]$; $Li[BF_2C_2O_4]$; $Li_2[B_{10}X_{10-j'}H_{j'}]$; or a mixture of any two or more thereof, wherein Z is independent at each occurrence a halogen, j is an integer from 0 to 12 and j' is an integer from 1 to 10.

In an aspect of the disclosure, the electrolyte further includes an aprotic organic solvent system selected from open-chain or cyclic carbonate, carboxylic acid ester, nitrite, ether, sulfone, sulfoxide, ketone, lactone, dioxolane, glyme, crown ether, siloxane, phosphoric acid ester, phosphite, mono- or polyphosphazene or mixtures thereof in a range of from 60% to 90% by weight.

Examples of aprotic solvents for generating electrolytes include but are not limited to dimethyl carbonate, ethyl methyl carbonate, diethyl carbonate, methyl propyl carbonate, ethyl propyl carbonate, dipropyl carbonate, propylene carbonate, ethylene carbonate, fluoroethylene carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, methyl propionate, ethyl propionate, butyl propionate, dimethoxyethane, triglyme, dimethylvinylene carbonate, tetraethyleneglycol, dimethyl ether, polyethylene glycols, triphenyl phosphate, tributyl phosphate, hexafluorocyclotriphosphazene, 2-Ethoxy-2,4,4,6,6-pentafluoro-1,3,5,2-5,4-5,6-5 triazatriphosphinine, triphenyl phosphite, sulfolane, dimethyl sulfoxide, ethyl methyl sulfone, ethylvinyl sulfone, allyl methyl sulfone, divinyl sulfone, fluorophenylmethyl sulfone and gamma-butyrolactone.

In an aspect of the disclosure, the electrolytes further include at least one additional additive to protect the electrodes and electrolyte from degradation. Thus, electrolytes of the present technology may include an additive that is reduced or polymerized on the surface of an electrode to form a passivation film on the surface of the electrode. In some embodiments, electrolytes of the present technology further include mixtures of the two types of additives.

In an embodiment, an additive is a substituted or unsubstituted linear, branched, or cyclic hydrocarbon including at least one oxygen atom and at least one aryl, alkenyl or alkynyl group. The passivating film formed from such additives may also be formed from a substituted aryl compound or a substituted or unsubstituted heteroaryl compound where the additive includes at least one oxygen atom.

Representative additives include glyoxal bis(diallyl acetal), tetra(ethylene glycol) divinyl ether, 1,3,5-triallyl-1,3,5-triazine-2,4,6(1H,3H,5H)-trione, 1,3,5,7-tetravinyl-1,3,5,7-tetramethylcyclotetrasiloxane, 2,4,6-triallyloxy-1,3,5-triazine, 1,3,5-triacryloylhexahydro-1,3,5-triazine, 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2-amino-3-vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2-vinyloxetane, 2-vinyloxy-cyclopropanone, 3-(N-vinylamino)cyclohexanone, 3,5-divinyl furoate, 3-vinylazetidin-2-one, 3 vinylaziridin-2-one, 3-vinylcyclobutanone, 3-vinylcyclopentanone, 3-vinyloxaziridine, 3-vinyloxetane, 3-vinylpyrrolidin-2-one, 2-vinyl-1,3-dioxolane, acrolein diethyl acetal, acrolein dimethyl acetal, 4,4-divinyl-3-dioxolan-2-one, 4-vinyltetrahydropyran, 5-vinylpiperidin-3-one, allylglycidyl ether, butadiene monoxide, butyl-vinyl-ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, β-vinyl-γ-butyrolactone or a mixture of any two or more thereof. In some embodiments, the additive may be a cyclotriphosphazene that is substituted with F, alkyloxy, alkenyloxy, aryloxy, methoxy, allyloxy groups, sulfonic acid groups, or combinations thereof. For example, the additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)cyclotriphosphazene, (methyl sulfonyl)cyclotriphosphazene, or (diaryloxy)(trifluoro)(methoxy)cyclotriphosphazene compounds or a mixture of two or more such compounds.

In some embodiments the additive is a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or the mixtures thereof. In some embodiments, the additive is vinyl carbonate, vinyl ethylene carbonate, or a mixture of any two or more such compounds. Further, the additive is present in a range of from 0.01% to 10% by weight.

In another aspect of the disclosure, an electrochemical energy storage device is provided that includes a cathode, an anode and an electrolyte including an ionic liquid as described herein. In one embodiment, the electrochemical energy storage device is a lithium secondary battery. In some embodiments, the secondary battery is a lithium battery, a lithium-ion battery, a lithium-sulfur battery, a lithium-air battery, a sodium ion battery, or a magnesium battery. In some embodiments, the electrochemical energy storage device is an electrochemical cell, such as a capacitor. In some embodiments, the capacitor is an asymmetric capacitor or supercapacitor. In some embodiments, the electrochemical cell is a primary cell. In some embodiments, the primary cell is a lithium/$MnO_2$ battery or Li/poly(carbon monofluoride) battery.

In an embodiment, a secondary battery is provided including a positive and a negative electrode separated from each other using a porous separator and the electrolyte described herein.

Suitable cathodes include those such as, but not limited to, a lithium metal oxide, spinel, olivine, carbon-coated olivine, $LiCoO_2$, $LiNiO_2$, $LiMn_{0.5}Ni_{0.5}O_2$, $LiMn_{0.3}Co_{0.3}Ni_{0.3}O_2$, $LiMn_2O_4$, $LiFeO_2$, $LiNi_xCo_yMet_zO_2$, $A_nB_2(XO_4)_3$, vanadium oxide, lithium peroxide, sulfur, polysulfide, a lithium carbon monofluoride (also known as $LiCF_x$) or mixtures of any two or more thereof, where Met is Al, Mg, Ti, B, Ga, Si, Mn or Co; A is Li, Ag, Cu, Na, Mn, Fe, Co, Ni, Cu or Zn; B is Ti, V, Cr, Fe or Zr; X is P, S, Si, W or Mo; and wherein $0 \leq x \leq 0.3$, $0 \leq y \leq 0.5$, and $0 \leq z \leq 0.5$ and $0 \leq n1 \leq 0.3$. According to some embodiments, the spinel is a spinel manganese oxide with the formula of $Li_{1+x}Mn_{2-z}Met'''_yO_{4-m}X'_n$, wherein Met''' is Al, Mg, Ti, B, Ga, Si, Ni or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$. In other embodiments, the olivine has a formula of $LiFePO_4$, or $Li_{1+x}Fe_{1-z}Met''_yPO_{4-m}X'_n$, wherein Met'' is Al, Mg, Ti, B, Ga, Si, Ni, Mn or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$.

Suitable anodes include those such as lithium metal, graphitic materials, amorphous carbon, carbon nanotubes, $Li_4Ti_5O_{12}$, tin alloys, silicon, silicon alloys, intermetallic compounds, or mixtures of any two or more such materials. Suitable graphitic materials include natural graphite, artificial graphite, graphitized meso-carbon microbeads (MCMB) and graphite fibers, as well as any amorphous carbon materials. In some embodiments, the anode and cathode electrodes are separated from each other by a porous separator.

The separator for the lithium battery often is a microporous polymer film. Examples of polymers for forming films include polypropylene, polyethylene, nylon, cellulose, nitrocellulose, polysulfone, polyacrylonitrile, polyvinylidene fluoride, polybutene, or copolymers or blends of any two or more such polymers. In some instances, the separator is an electron beam-treated micro-porous polyolefin separator. The electron treatment can increase the deformation temperature of the separator and can accordingly enhance thermal stability at high temperatures. Additionally, or alternatively, the separator can be a shut-down separator. The shut-down separator can have a trigger temperature above about 130° C. to permit the electrochemical cells to operate at temperatures up to about 130° C.

The disclosure will be further illustrated with reference to the following specific examples. It is understood that these examples are given by way of illustration and are not meant to limit the disclosure or the claims to follow.

Example 1—4H-1,1-dioxo-2,6-di(phenyl)-4-(dicyanomethylidene)thiopyran

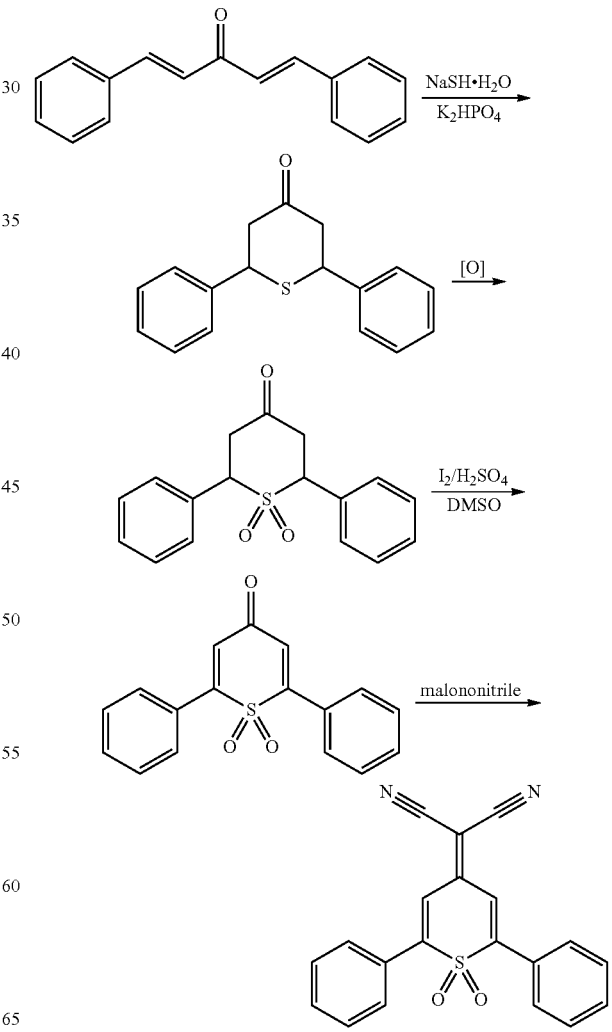

Step A: Michael Addition

| Reagent | MW | Equiv | Mol | Mass (q) | Density | Volume (mL) | Conc | Yield (calc) |
|---|---|---|---|---|---|---|---|---|
| 1,5-diphenylpenta-dienone | 234.32 | 1.00 | 0.043 | 10.0 | | #DIV/0! | | |
| sodium hydrosulfide hydrate | 56.06 | 2.00 | 0.085 | 4.8 | | #DIV/0! | | |
| IPA | | | | 48.0 | 0.886 | 54.2 | 20% | |
| DI water | | | | | | 50.0 | | |
| K2HPO4 | 174.20 | 1.50 | 0.064 | 11.2 | | #DIV/0! | | |
| 2,6-diphenylthiopyran-4-one | 268.38 | 1.00 | | | | | | 11.5 |

To a 250 mL 3-neck flask equipped with a magnetic stirring bar and thermocouple was added a solution of dibasic potassium phosphate in deionized (DI) water (50 mL) to a partially dissolved solution of dibenzalacetone in isopropyl alcohol (IPA) (50 mL). While stirring at RT, sodium hydrosulfide hydrate was slowly added and no exotherm was observed. The mixture was heated to 60° C. for 2 h and then stirred at RT for 2 h. The mixture completely dissolved and then quickly deposited a solid white ppt. TLC on silica gel in 100% dichlormethane (DCM) presented one new spot at slightly higher Rf than starting compound. The solid was collected by vacuum filtration and the pad was washed with IPA (2×10 mL). The solid was air dried and used without further purification. Yield: white solid, 11.0 g (96%). FTIR: 1702, 1245, 694, 498 $cm^{-1}$ Step B: Oxidation of Sulfide to Sulfone

| Reagent | MW | Equiv | Mol | Mass (q) | Density | Volume (mL) | Conc | Yield (calc) |
|---|---|---|---|---|---|---|---|---|
| 2,6-diphenylthiopyran-4-one | 268.38 | 1.00 | 0.041 | 11.0 | | #DIV/0! | | |
| peracetic acid 32% | 76.05 | 2.10 | 0.086 | 20.5 | 1.130 | 18.1 | | |
| DCM | | | | 62.9 | 1.326 | 47.4 | 50% | |
| 2,6-diphenylthiopyran-4-one-dioxide | 300.38 | 1.00 | | | | | | 12.3 |

To a 250 mL Erlenmeyer flask equipped with a magnetic stirring bar and thermocouple was added the (Step A) product, and DCM (50 mL). While stirring at RT, peracetic acid was added dropwise and an exotherm to 45° C. was observed. The exotherm was much milder toward the end of addition. TLC on silica gel in 100% DCM presented two new spots at lower Rf than starting compound. The mixture stirred at RT for 1 h. DI water (100 mL) was added and the mixture was poured into a separatory funnel. The organic phase was extracted into DCM (2×50 mL), washed with 5% NaOH (20 mL), separated, washed with brine (30 mL), separated, dried over $MgSO_4$, filtered and the solvent stripped by rotary evaporation to solid. Yield: pale white solid, 12.3 g (>99%).

Step C: Dehydrogenation to Sulfone-Dienone

| Reagent | MW | Equiv | Mol | Mass (q) | Density | Volume (mL) | Conc | Yield (calc) |
|---|---|---|---|---|---|---|---|---|
| 2,6-diphenylthiopyran-4-one-dioxide | 300.38 | 1.00 | 0.041 | 12.3 | | #DIV/0! | | |
| Iodine | 126.90 | 0.07 | 0.003 | 1.1 | | #DIV/0! | | |
| DMSO | 78.13 | | | 35.1 | 1.10 | 31.9 | 35% | |
| sulfuric acid | 98.079 | 0.30 | 0.012 | 1.2 | 1.83 | 0.7 | | |
| 2,6-diphenyl-4H-thiopyran-4-one-dioxide | 296.38 | 1.00 | | | | | | 12.1 |

To the 250 mL RB flask containing the (Step B) product was placed a magnetic stirring bar and thermocouple. DMSO (30 mL), iodine and sulfuric acid were added and the mixture was heated to 90° C. for 2 h. TLC on silica gel in 100% DCM presented one yellow spot at higher Rf than starting compound. DI water (100 mL) was added and the mixture was poured into a separatory funnel. The organic phase was extracted into DCM (2×50 mL), separated, dried over $MgSO_4$ and the solvent stripped by rotary evaporation to solid. The solid was slurried in IPA (30 mL) and collected by vacuum filtration. Yield: yellow solid, 8.5 g (70%). FTIR: 1644, 1294, 1131, 768, 693, 531, 518 $cm^{-1}$ Step D: Addition of Dicyanomethylene

| Reagent | MW | Equiv | Mol | Mass (q) | Density | Volume (mL) | Conc | Yield (calc) |
|---|---|---|---|---|---|---|---|---|
| 2,6-diphenyl-4H-thiopyran-4-one-dioxide | 296.38 | 1.00 | 0.029 | 8.5 | | #DIV/0! | | |
| malononitrile | 66.06 | 1.30 | 0.037 | 7.7 | 1.190 | 6.5 | | |
| piperidine (cat.) | 85.15 | | | cat. | 0.862 | | | |
| ethanol | | | | 46.3 | 0.886 | 52.2 | 35% | |
| 2,6-diphenyl-sulfone | 344.44 | 1.00 | | | | | | 9.9 |

To a 250 mL 3-neck flask equipped with a magnetic stirring bar, water-cooled condenser, N2 inlet and thermo-couple was added the (Step C) product, ethanol (50 mL) and malononitrile. While stirring at RT, piperidine was slowly added by pipet and an exotherm to 30° C. was observed. The mixture turned blood red and was heated to 60° C. for 1 h. The mixture slowly went into solution and the product precipitated from the reaction. The mixture stirred at RT for 1 h. TLC on silica gel in 100% DCM gave one new bright yellow fluorescing spot at slightly higher Rf than sulfone-dienone. The solid was collected by vacuum filtration and was washed with reagent alcohol (2×10 mL). The solid was recrystallized from boiling reagent alcohol (80 mL) and ethyl acetate (2 mL). The solid was collected by vacuum filtration and dried by vacuum oven (5 mbar, 60° C.). Yield: light yellow solid, 7.0 g (71%).

FTIR: 2223, 1304, 1131, 759, 681, 536 cm$^{-1}$; mp: 218-222° C.

H$^+$ NMR: (CDCl$_3$) δ ppm 7.86 (d, 4H), 7.61 (t, 2H), 7.54 (t, 4H), 7.32 (s, 2H).

Example 2—4H-1,1-dioxo-2-phenyl-6-(4-methylphenyl)-4-(dicyanomethylidene)thiopyran

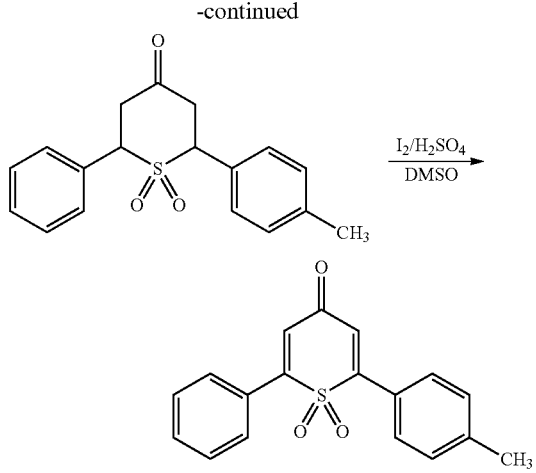

Step A: Aldol Condensation

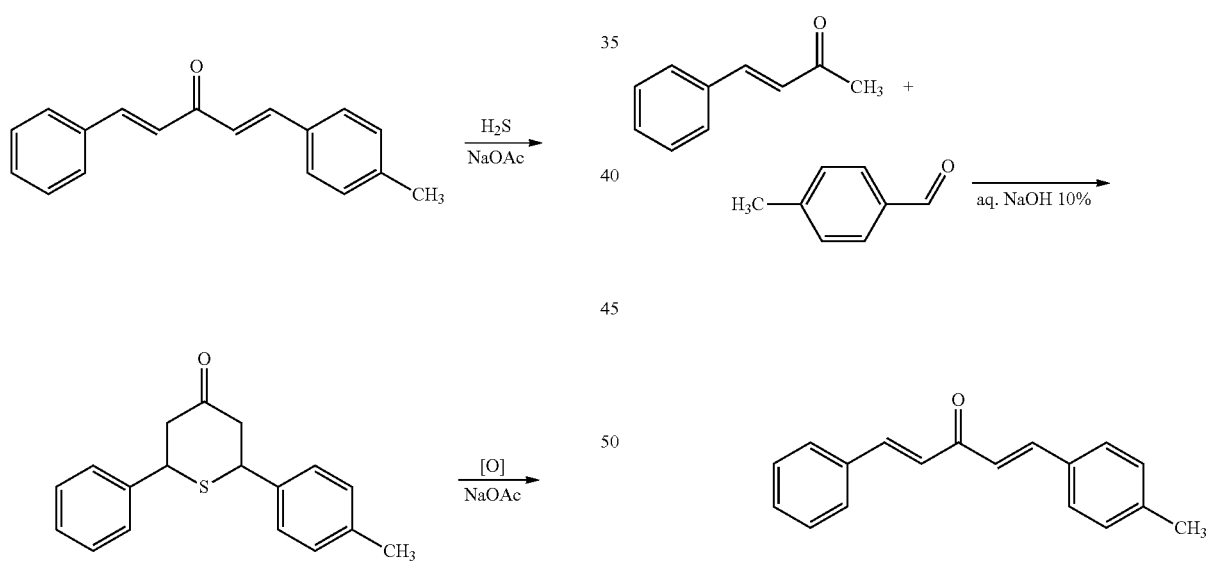

| Reagent | MW | Equiv | Mol | Mass (q) | Density | Volume (mL) | Conc | Yield (calc) |
|---|---|---|---|---|---|---|---|---|
| trans-4-phenyl-3-butene-2-one | 146.19 | 1.00 | 0.034 | 5.0 | | #DIV/0! | | |
| p-tolualdehyde | 120.15 | 1.00 | 0.034 | 4.1 | 1.019 | 4.0 | | |
| reagent alcohol | | | | 22.8 | 0.789 | 28.9 | 40% | |
| aqueous NaOH (10%) | 40.00 | 1.00 | 0.034 | 1.4 | 1.110 | 1.2 | | |
| 1-phenyl-5-tolyl-dienone | 248.34 | 1.00 | 0.000 | | | | | 8.5 |

To a 125 mL Erlenmeyer flask equipped with a magnetic stirring bar was added p-tolualdehyde, reagent alcohol (30 mL) and trans-4-phenyl-3-butene-2-one. While stirring at RT, aqueous NaOH 10% (1.5 mL) was added by pipet. The yellow mixture quickly darkened and DI water was added dropwise until a cloudy suspension was formed. After 10 min., a bright yellow crystalline ppt formed and the mixture stirred at RT for 2 h. TLC on silica gel in 100% DCM presented one new faint yellow spot and no byproducts or unreacted reactants. The solid was collected by vacuum filtration and washed with reagent alcohol (2×10 mL). Yield: bright yellow solid, 6.3 g (74%). FTIR: 1618, 1584, 1336, 1095, 987, 807, 689 $cm^{-1}$ Step B: Michael Addition

| Reagent | MW | Equiv | Mol | Mass (g) | Density | Volume (mL) | Conc | Yield (calc) |
|---|---|---|---|---|---|---|---|---|
| 1-phenyl-5-tolyl-dienone | 248.34 | 1.00 | 0.034 | 8.5 | | #DIV/0! | | |
| H2S | 34.08 | 1.00 | 0.034 | 1.2 | | | | |
| ethanol | 82.03 | 0.25 | 0.009 | 32.2 | 0.886 | 36.4 | 30% | |
| NaOAc | | | | 0.7 | | | | |
| 2-phenyl-6-tolyl-thiopyran-4-one | 282.42 | 1.00 | | | | | | 9.7 |

To a 250 mL 3-neck flask equipped with a magnetic stirring bar, water-cooled condenser, N2 bubbler vent, gas inlet tube (sub-surface) and thermocouple was added the (Step A) product, reagent alcohol (30 mL) and sodium acetate. While stirring at 60° C., hydrogen sulfide gas was slowly bubbled into the reaction mixture. The solids quickly dissolved and the mixture stirred for 2 h. TLC on silica gel in 100% DCM presented one new spot at higher Rf than starting dienone and no byproducts or unreacted reactants. The reaction solvent was stripped by rotary evaporation to a yellow sticky solid. The solid was dispersed in IPA (30 mL) and a pale yellow solid was collected by vacuum filtration. The mother liquor quickly solidified and was dispersed in hexane (40 mL) and a pale white solid was collected by vacuum filtration. Yield: pale white solid.

Step C: Oxidation of Sulfide to Sulfone

| Reagent | MW | Equiv | Mol | Mass (g) | Density | Volume (mL) | Conc | Yield (calc) |
|---|---|---|---|---|---|---|---|---|
| 2-phenyl-6-tolyl-thiopyran-4-one | 282.42 | 1.00 | 0.034 | 9.7 | | #DIV/0! | | |
| peracetic acid 32% | 76.05 | 2.10 | 0.072 | 17.1 | 1.130 | 15.2 | | |
| DCM | | | | 53.7 | 1.326 | 40.5 | 50% | |
| NaOAc | 82.03 | 0.25 | 0.009 | 0.7 | | | | |
| 2-phenyl-6-tolyl-thiopyran-4-one-dioxide | 314.42 | 1.00 | | | | | | 10.8 |

To a 250 mL Erlenmeyer flask equipped with a magnetic stirring bar and thermocouple was added the (Step B) product, sodium acetate and DCM (60 mL). The flask was placed in a water/ice bath. While stirring at 5° C., peracetic acid was added dropwise and a maximum exotherm to 15° C. was observed. The ice slowly melted and the mixture continued to stir at RT for 18 h. TLC on silica gel in 100% DCM presented two new spots at lower Rf than starting sulfide. DI water (100 mL) was added and the mixture was poured into a separatory funnel. The organic phase was extracted into DCM, separated, dried over MgSO$_4$, filtered and the solvent stripped by rotary evaporation to oil. The oil was pumped under high vacuum and slurried in hexane. A solid was collected by vacuum filtration and air dried. Yield: pale white solid, 6.4 g (60%).

Step D: Dehydrogenation to Sulfone-Dienone

| Reagent | MW | Equiv | Mol | Mass (g) | Density | Volume (mL) | Conc | Yield (calc) |
|---|---|---|---|---|---|---|---|---|
| 2-phenyl-6-tolyl-thiopyran-4-one-dioxide | 314.42 | 1.00 | 0.020 | 6.4 | | #DIV/0! | | |
| Iodine (cat.) | 126.90 | 0.07 | 0.001 | 0.2 | | #DIV/0! | | |
| DMSO | 78.13 | | | 32.0 | 1.10 | 29.1 | 20% | |
| sulfuric acid | 98.08 | 0.30 | 0.006 | 0.6 | 1.83 | 0.3 | | |
| 2-phenyl-6-tolyl-4H-thiopyran-4-one-dioxide | 310.42 | 1.00 | | | | | | 6.3 |

To the 250 mL RB flask containing the (Step C) product was placed DMSO (20 mL), a magnetic stirring bar and thermocouple. Iodine crystals (cat.) and sulfuric acid (cat.) were added and the mixture quickly turned dark yellow. The mixture was heated to 90° C. for 2 h. TLC on silica gel in 100% DCM presented one pale yellow spot at higher Rf than starting sulfone. DI water (100 mL) was added and the mixture was poured into a separatory funnel, extracted from DCM (4×30 mL), separated, dried over MgSO$_4$ and the solvent stripped by rotary evaporation to oil. Yield: dark brown oil, 6.3 g (>99%). Reagent alcohol was added and a crystalline solid was formed and collected by vacuum filtration. Yield: bright yellow solid, 4.3 g (68%). FTIR: 1641, 1303, 1129, 900, 814, 764, 671, 521 cm$^{-1}$ Step E: Addition of Dicyanomethylene

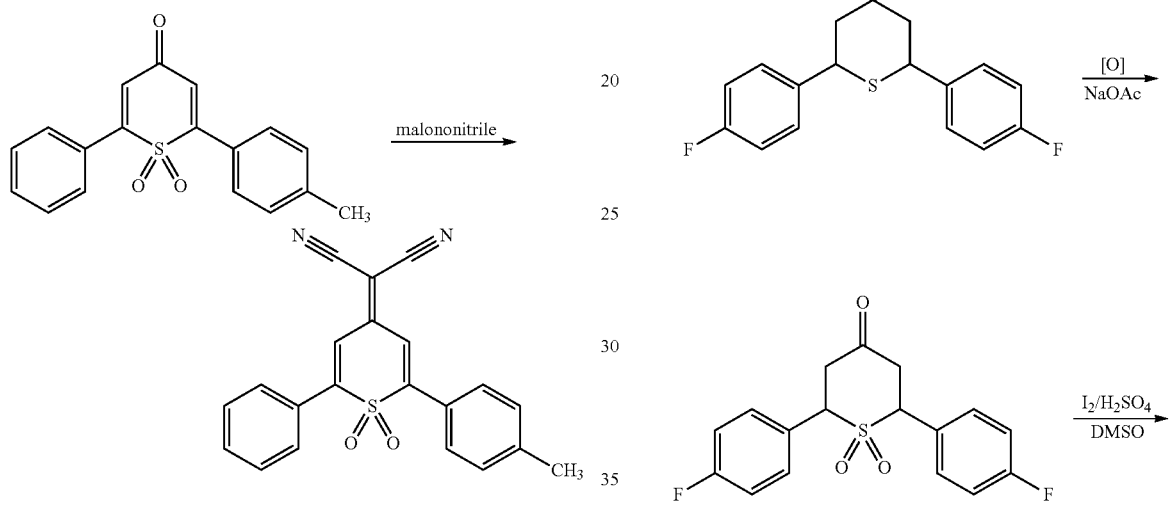

| Reagent | MW | Equiv | Mol | Mass (g) | Density | Volume (mL) | Conc | Yield (calc) |
|---|---|---|---|---|---|---|---|---|
| 2-phenyl-6-tolyl-4H-thiopyran-4-one-dioxide | 310.42 | 1.00 | 0.014 | 4.3 | | #DIV/0! | | |
| malononitrile | 66.06 | 1.10 | 0.015 | 1.0 | 1.190 | 0.8 | | |
| piperidine (cat.) | 85.15 | | | cat. | 0.862 | | | |
| reagent alcohol | | | | 15.2 | 0.886 | 17.1 | 35% | |
| phenyltolyl-sulfone (PTS) | 358.48 | 1.00 | | | | | | 5.0 |

To a 100 mL 3-neck flask equipped with a magnetic stirring bar, water-cooled condenser, N2 inlet and thermocouple was added the (Step D) product, reagent alcohol (30 mL) and malononitrile. While stirring at RT, piperidine was added by pipet. The mixture turned blood red and slowly dissolved. The mixture was heated to 60° C. for 2 h and a solid ppt was formed. TLC on silica gel in 100% DCM gave one new bright yellow fluorescing spot at slightly higher RF than starting sulfone-dienone. The mixture was cooled to RT and the solid was collected by vacuum filtration and washed with reagent alcohol (2×5 mL). Crude yield: yellow solid, 3.0 g (60%). The solid was hot slurried from boiling reagent alcohol (80 mL) and ethyl acetate (2 mL). The solid was chilled and collected cold by vacuum filtration and dried by vacuum oven (5 mbar, 60° C.). Yield: light yellow solid, 3.0 g (60%).

FTIR: 2224, 1558, 1302, 1130, 817, 764, 574, 495 cm$^{-1}$; mp: 189-191° C.

NMR: (CDCl$_3$) δ ppm 7.85 (d, 2H), 7.78 (d, 2H), 7.60 (t, 1H), 7.54 (t, 2H), 7.34 (d, 2H), 7.31 (q, 2H), 2.45 (s, 3H).

Example 3—4H-1,1-dioxo-2,6-di(4-fluorophenyl)-4-(dicyanomethylidene)thiopyran

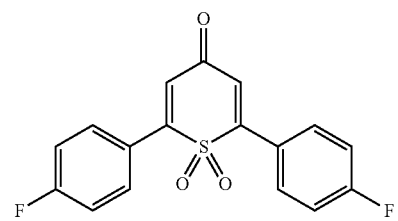

-continued

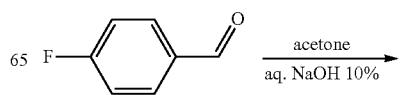

Step A: Aldol Condensation

-continued

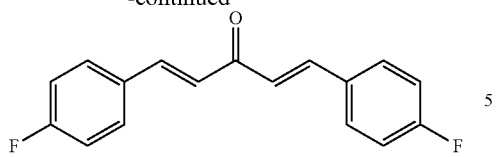

5

| Reagent | MW | Equiv | Mol | Mass (g) | Density | Volume (mL) | Conc | Yield (calc) |
|---|---|---|---|---|---|---|---|---|
| acetone | 58.08 | 1.00 | 0.034 | 2.0 | 0.786 | 2.5 | | |
| 4-fluorobenzaldehyde | 124.12 | 2.00 | 0.069 | 8.5 | 1.157 | 7.4 | | |
| reagent alcohol | | | | 26.4 | 0.789 | 33.4 | 40% | |
| aqueous NaOH (10%) | 40.00 | 1.00 | 0.034 | 1.4 | 1.110 | 1.2 | | |
| Bis-4-fluorophenyl-dienone | 270.32 | 1.00 | 0.000 | | | | | 9.3 |

To a 125 mL Erlenmeyer flask equipped with a magnetic stirring bar was added reagent alcohol (30 mL), 4-fluorobenzaldehyde and acetone. While stirring at RT, aqueous NaOH 10% (1.5 mL) was added by pipet. The colorless mixture quickly darkened and DI water was added dropwise until a cloudy suspension was formed. After 10 min., a yellow crystalline ppt formed and the mixture stirred at RT for 4 h. TLC on silica gel in 100% DCM presented one new faint yellow spot and no byproducts or unreacted reactants. The solid was collected by vacuum filtration and washed with reagent alcohol (5 mL). Yield: light yellow solid, 8.0 g (89%).

Step B: Michael Addition

| Reagent | MW | Equiv | Mol | Mass (g) | Density | Volume (mL) | Conc | Yield (calc) |
|---|---|---|---|---|---|---|---|---|
| Bis-4-fluorophenyl-dienone | 270.32 | 1.00 | 0.030 | 8.0 | | #DIV/0! | | |
| H2S | 34.08 | 1.00 | 0.030 | 1.0 | | | | |
| reagent alcohol | | | | 30.0 | 0.789 | 38.1 | 30% | |
| NaOAc | 82.03 | 0.50 | 0.015 | 1.2 | | #DIV/0! | | |
| Bis-4-fluorophenyl-thiopyran-4-one | 304.40 | 1.00 | | | | | | 9.0 |

To a 250 mL 3-neck flask equipped with a magnetic stirring bar, water-cooled condenser, N2 bubbler vent, gas inlet tube (sub-surface) and thermocouple was added the (Step A) product, reagent alcohol (30 mL), DMF (1 mL) and sodium acetate. While stirring at 60° C., hydrogen sulfide gas was slowly bubbled into the reaction mixture. The solids quickly dissolved and the mixture stirred for 4 h. TLC on silica gel in 100% DCM presented one new spot at higher Rf than starting dienone and an unknown impurity at higher Rf than desired product but no other byproducts or unreacted reactants. The mixture was cooled to RT, DI water (100 mL) was added and the mixture was poured into a separatory funnel. The organic phase was extracted into DCM (3×20 mL), separated, dried over $MgSO_4$, filtered and used in the next step without further purification assuming theoretical yield.

Step C: Oxidation of Sulfide to Sulfone

| Reagent | MW | Equiv | Mol | Mass (g) | Density | Volume (mL) | Conc | Yield (calc) |
|---|---|---|---|---|---|---|---|---|
| Bis-4-fluorophenyl-thiopyran-4-one | 304.40 | 1.00 | 0.030 | 9.0 | | #DIV/0! | | |
| peracetic acid 32% | 76.05 | 2.10 | 0.062 | 14.8 | 1.130 | 13.1 | | |
| DCM | | | | 79.2 | 1.326 | 59.7 | 30% | |
| NaOAc | 82.03 | 0.50 | 0.015 | 1.2 | | | | |
| Bis-4-fluorophenyl-thiopyran-4-one-dioxide | 336.40 | 1.00 | | | | | | 9.9 |

To a 250 mL Erlenmeyer flask equipped with a magnetic stirring bar and thermocouple was added the (Step B) product in DCM (60 mL) and sodium acetate. While stirring at RT, peracetic acid was added dropwise and a maximum exotherm to 40° C. was observed. The exotherm was much milder toward the end of addition. TLC on silica gel in 100% DCM presented two new spots at lower Rf than starting compound. The mixture stirred at RT for 1 h. DI water (100 mL) was added and the mixture was poured into a separatory funnel. The organic phase was extracted into DCM, washed with 10% NaOH (80 mL), separated, dried over MgSO$_4$ and the solvent stripped by rotary evaporation to solid. Yield: pale yellow solid, 9.0 g (91%).

Step D: Dehydrogenation to Sulfone-Dienone

| Reagent | MW | Equiv | Mol | Mass (g) | Density | Volume (mL) | Conc | Yield (calc) |
|---|---|---|---|---|---|---|---|---|
| Bis-4-fluorophenyl-thiopyran-4-one-dioxide | 336.40 | 1.00 | 0.027 | 9.0 | | #DIV/0! | | |
| Iodine (cat.) | 126.90 | 0.07 | 0.002 | 0.2 | | #DIV/0! | | |
| DMSO | 78.13 | | | 25.7 | 1.10 | 23.4 | 35% | |
| sulfuric acid (cat.) | 98.079 | 0.30 | 0.008 | 0.8 | 1.83 | 0.4 | | |
| Bis-4-fluorophenyl-4H-thiopyran-4-one-dioxide | 332.40 | 1.00 | | | | | | 8.9 |

To the 250 mL RB flask containing the (Step C) product was placed DMSO (30 mL) and a magnetic stirring bar. Iodine crystals (cat.) and sulfuric acid (cat.) were added and the colorless mixture quickly turned dark yellow. The mixture was heated to 60° C. for 2 h. TLC on silica gel in 100% DCM presented one pale yellow spot at higher Rf than starting compound. DI water (100 mL) was added and the mixture was poured into a separatory funnel, extracted from DCM (4×30 mL), washed with 10% NaOH (2 mL), separated, dried over MgSO$_4$ and the solvent stripped by rotary evaporation to oil. Reagent alcohol (20 mL) was added and a crystalline solid formed and collected by vacuum filtration. Yield: light yellow solid, 4.1 g (46%). FTIR: 1644, 1584, 1504, 1230, 830, 507 cm$^{-1}$ Step E: Addition of Dicyanomethylene

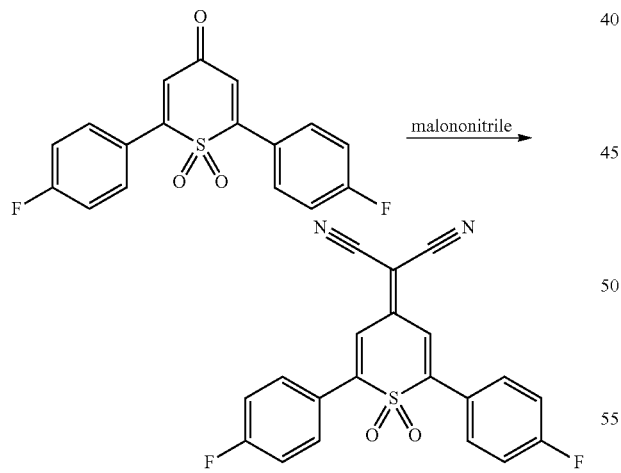

| Reagent | MW | Equiv | Mol | Mass (g) | Density | Volume (mL) | Conc | Yield (calc) |
|---|---|---|---|---|---|---|---|---|
| Bis-4-fluorophenyl-4H-thiopyran-4-one-dioxide | 332.40 | 1.00 | 0.012 | 4.1 | | #DIV/0! | | |
| malononitrile | 66.06 | 1.10 | 0.014 | 0.9 | 1.190 | 0.8 | | |
| piperidine (cat.) | 85.15 | | | cat. | 0.862 | | | |

-continued

| Reagent | MW | Equiv | Mol | Mass (g) | Density | Volume (mL) | Conc | Yield (calc) |
|---|---|---|---|---|---|---|---|---|
| reagent alcohol | | | | 25.0 | 0.789 | 31.7 | 20% | |
| Bis-4-fluorophenyl-sulfone (p-FPS) | 380.46 | 1.00 | | | | | | 4.7 |

To a 100 mL 3-neck flask equipped with a magnetic stirring bar, water-cooled condenser, N2 inlet and thermocouple was added the (Step D) product, reagent alcohol (30 mL) and malononitrile.

While stirring at RT, piperidine was slowly added by pipet and no exotherm was observed. The mixture turned blood red and was heated to 60° C. for 2 h. A dark orange suspension quickly precipitated from the reaction solution. TLC on silica gel in 100% DCM gave one new faint yellow spot at slightly lower Rf than sulfone-dienone. The mixture was cooled and stirred at RT for 1 h. The solid was collected by vacuum filtration, washed with reagent alcohol (2×5 mL) and dried by vacuum oven (5 mbar, 60° C.). Yield: burnt orange solid, 4.0 g (85%). The solid was hot slurried from boiling reagent alcohol (30 mL), chilled and collected cold by vacuum filtration and dried by vacuum oven (5 mbar, 60° C.). Yield: burnt orange solid, 2.4 g (51%). FTIR: 2223, 1597, 1504, 1301, 1226, 1134, 835 cm$^{-1}$; mp: 216-218° C. H$^+$ NMR: (CDCl$_3$) δ ppm 7.86 (m, 4H), 7.22 (m, 5H), 6.66 (s, 1H). F$^{19}$ NMR: (CDCl$_3$) δ ppm −105.12 (s, 1F), −106.43 (s, 1F).

Example 4—4H-1,1-dioxo-2,6-di(2-thienyl)-4-(dicyanomethylidene)thiopyran

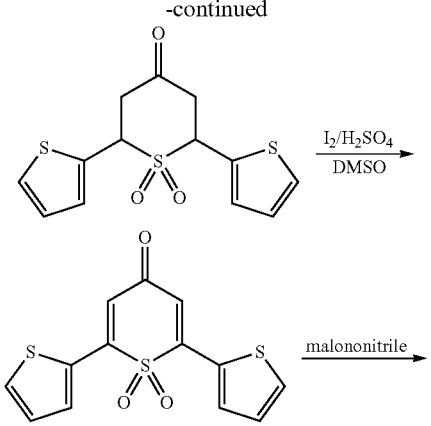

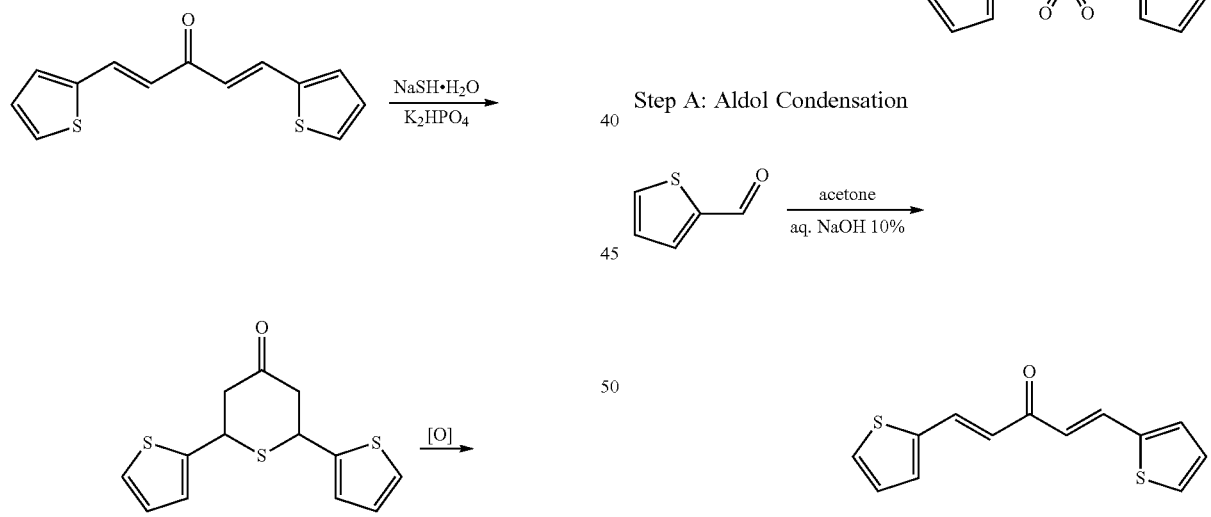

Step A: Aldol Condensation

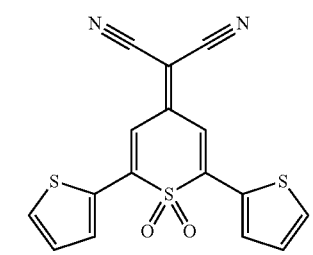

| Reagent | MW | Equiv | Mol | Mass (g) | Density | Volume (mL) | Conc | Yield (calc) |
|---|---|---|---|---|---|---|---|---|
| acetone | 58.08 | 1.00 | 0.052 | 3.0 | 0.786 | 3.8 | | |
| 2-thiophenecarboxaldehyde | 112.15 | 2.00 | 0.103 | 11.6 | 1.200 | 9.7 | | |
| reagent alcohol | | | | 36.5 | 0.789 | 46.2 | 40% | |
| aqueous NaOH (10%) | 40.00 | 2.05 | 0.106 | 4.2 | 0.726 | 5.8 | | |
| Bis-2-thiophene-dienone | 246.38 | 1.00 | 0.000 | | | | | 12.7 |

To a 125 mL Erlenmeyer flask equipped with a magnetic stirring bar was added 2-thiophene carboxaldehyde, reagent alcohol (30 mL) and acetone. While stirring at RT, aqueous NaOH 10% (4 mL) was added by pipet. A mild exotherm was observed and the mixture quickly turned dark yellow. After 30 min., a bright yellow crystalline ppt formed and the mixture stirred at RT for 2 h. TLC on silica gel in 100% DCM presented one new yellow spot at slightly lower Rf than starting aldehyde. The solid was collected by vacuum filtration and washed with reagent alcohol (2×5 mL). Yield: yellow solid, 12.0 g (94%). FTIR: 1601, 1560, 966, 726, 563 cm$^{-1}$ Step B: Michael Addition

| Reagent | MW | Equiv | Mol | Mass (g) | Density | Volume (mL) | Conc | Yield (calc) |
|---|---|---|---|---|---|---|---|---|
| Bis-thiophene-dienone | 246.38 | 1.00 | 0.049 | 12.0 | | #DIV/0! | | |
| sodium hydrosulfide hydrate | 56.06 | 2.00 | 0.097 | 5.5 | | #DIV/0! | | |
| reagent alcohol | | | | 39.7 | 0.789 | 50.3 | 25% | |
| DI water | | | | | | 50.0 | | |
| K2HPO4 | 174.20 | 1.50 | 0.073 | 12.7 | | #DIV/0! | | |
| Bis-2-thiophene-thiopyran-4-one | 280.44 | 1.00 | | | | | | 13.7 |

To a 250 mL 3-neck flask equipped with a magnetic stirring bar and thermocouple was added a solution of dibasic potassium phosphate in DI water (50 mL) to a partially dissolved solution of the (Step A) product in reagent alcohol (50 mL). While stirring at RT, sodium hydrosulfide hydrate was slowly added in one portion and no exotherm was observed. The mixture was heated to 60° C. for 2 h and solids completely dissolved. TLC on silica gel in 100% DCM presented one new spot at higher Rf than starting dienone. The mixture slowly cooled to RT and stirred for 1 h.

DI water (150 mL) was added and the mixture was poured into a separatory funnel. The organic phase was extracted into DCM (60 mL), separated, dried over MgSO$_4$, filtered and the solvent stripped by rotary evaporation to sticky solid. The solid was air dried and used without further purification. Yield: yellow solid, 14.0 g (>99%).

Step C: Oxidation of Sulfide to Sulfone

| Reagent | MW | Equiv | Mol | Mass (g) | Density | Volume (mL) | Conc | Yield (calc) |
|---|---|---|---|---|---|---|---|---|
| Bis-2-thiophene-thiopyran-4-one | 280.44 | 1.00 | 0.049 | 13.7 | | #DIV/0! | | |
| peracetic acid 32% | 76.05 | 2.10 | 0.103 | 24.4 | 1.130 | 21.6 | | |
| DCM | | | | 76.2 | 1.326 | 57.4 | 50% | |
| Bis-2-thiophene-thiopyran-4-one-dioxide | 312.44 | 1.00 | | | | | | 15.3 |

To a 250 mL Erlenmeyer flask equipped with a magnetic stirring bar and thermocouple was added the (Step B) product, and DCM (60 mL). While stirring at RT, peracetic acid was added dropwise and an exotherm to 40° C. was observed. The exotherm was much milder toward the end of addition. TLC on silica gel in 100% DCM presented two new spots at lower Rf than starting compound. The mixture stirred at RT for 1 h. DI water (100 mL) was added and the mixture was poured into a separatory funnel. The organic phase was extracted into DCM (2×50 mL), washed with 5% NaOH (20 mL), separated, washed with brine (30 mL), separated, dried over MgSO$_4$, filtered and the solvent stripped by rotary evaporation to solid. Yield: reddish-yellow solid, 15.3 g (>99%).

Step D: Dehydrogenation to Sulfone-Dienone

| Reagent | MW | Equiv | Mol | Mass (g) | Density | Volume (mL) | Conc | Yield (calc) |
|---|---|---|---|---|---|---|---|---|
| Bis-2-thiophene-thiopyran-4-one-dioxide | 312.44 | 1.00 | 0.049 | 15.3 | | #DIV/0! | | |
| Iodine | 126.90 | 0.07 | 0.003 | 1.4 | | #DIV/0! | | |

-continued

| Reagent | MW | Equiv | Mol | Mass (g) | Density | Volume (mL) | Conc | Yield (calc) |
|---|---|---|---|---|---|---|---|---|
| DMSO | 78.13 | | | 43.7 | 1.10 | 39.7 | 35% | |
| sulfuric acid | 98.079 | 0.30 | 0.015 | 1.4 | 1.83 | 0.8 | | |
| Bis-2-thiophene-4H-thiopyran-4-one-dioxide | 308.44 | 1.00 | | | | | | 15.1 |

To the 250 mL RB flask containing the (Step C) product was placed a magnetic stirring bar and thermocouple. DMSO (40 mL), iodine and sulfuric acid were added and the mixture was heated to 70° C. for 2 h. TLC on silica gel in 100% DCM presented one yellow spot at higher Rf than starting compound. DI water (100 mL) was added and the mixture was poured into a separatory funnel. The organic phase was extracted into DCM (2×50 mL), separated, dried over $MgSO_4$ and the solvent stripped by rotary evaporation to dark brown solid. The solid was hot slurried in ethyl acetate/reagent alcohol (60 mL) and collected by vacuum filtration. Yield: reddish-orange solid, 13.0 g (86%). FTIR: 1629, 1565, 1299, 713, 520 $cm^{-1}$ Step E: Addition of Dicyanomethylene

| Reagent | MW | Equiv | Mol | Mass (g) | Density | Volume (mL) | Conc | Yield (calc) |
|---|---|---|---|---|---|---|---|---|
| Bis-2-thiophene-4H-thiopyran-4-one-dioxide | 308.44 | 1.00 | 0.042 | 13.0 | | #DIV/0! | | |
| malononitrile | 66.06 | 1.10 | 0.046 | 9.6 | 1.190 | 8.0 | | |
| piperidine (cat.) | 85.15 | | | cat. | 0.862 | | | |
| reagent alcohol | | | | 45.1 | 0.789 | 57.2 | 50% | |
| Bis-2-thiophene-sulfone | 356.50 | 1.00 | | | | | | 15.0 |

To a 100 mL 3-neck flask equipped with a magnetic stirring bar, water-cooled condenser, N2 inlet and thermocouple was added the (Step D) product, reagent alcohol (60 mL) and malononitrile. While stirring at RT, piperidine was slowly added by pipet and an exotherm to 30° C. was observed. The mixture turned blood red and was heated to 60° C. for 1 h. The mixture slowly went into solution and the product precipitated from the reaction. The mixture stirred at RT for 1 h. TLC on silica gel in 100% DCM gave one new bright yellow fluorescing spot at slightly higher Rf than sulfone-dienone. The solid was collected by vacuum filtration and recrystallized from boiling reagent alcohol and ethyl acetate. The solid was collected by vacuum filtration and dried by vacuum oven (5 mbar, 60° C.). Yield: reddish-orange solid, 1.5 g (10%). FTIR: 2218, 1613, 1551, 1311, 716, 545 $cm^{-1}$; mp: 274-277° C.

Example 5—Electrolyte Formulations for NMC811/Gr Cells

Electrolyte formulations were prepared in a dry argon filled glovebox by combining all electrolyte components in glass vials by stirring for 24 hours to ensure complete dissolution of all solids. The cyclic sulfone additive materials are added to a base electrolyte formulation comprising a 3:7 by volume mixture of ethylene carbonate, "EC", ethyl methyl carbonate, "EMC", and 1 M lithium hexafluorophosphate, "LiPF6", as a $Li^+$ ion conducting salt, dissolved therein. Vinylene carbonate "VC" is used as standard anode SEI forming additive, and 1,3-propanesultone "PaS" is used as a comparative example. The electrolyte formulations are listed in Table A.

TABLE A

Electrolyte Formulations used in NMC811/Gr cells

| Electrolyte | Base Formulation | Additive Weight (%) |
|---|---|---|
| Comparative Example 1 (CE1) | 1.0M $LiPF_6$ in EC:EMC (3:7) | VC: 2% |
| Comparative Example 2 (CE2) | 1.0M $LiPF_6$ in EC:EMC (3:7) | VC: 2%, PaS: 0.5% |
| Embodiment Example 1 (EE1) | 1.0M $LiPF_6$ in EC:EMC (3:7) | VC: 2%, Example 1: 0.5% |

Example 6—Electrochemical Cell Data for NMC811/Gr Cells

The electrolyte formulations prepared are used as electrolytes in 1.8 Ah Li-ion pouch cells comprising NMC811 cathode active material and graphite as the anode active material. The cell operation voltage window is 4.2-2.8 V. In each cell, 6 g of electrolyte was added and allowed to soak in the cell for 1 hour. The cells were vacuum sealed and allowed to rest at room temperature for 24 hours. The cells were then charged to 3.7 V at C/50 rate before degassing, followed by vacuum sealing. After degassing, the cells were charged and discharged twice between 4.2 to 2.8 V at C/10 rate, and the results are summarized in Table B. The reported formation discharge capacity is for the last cycle of formation at C/5 rate and AC-IR is the measured internal resistance at 1 kHz frequency. It is evident that the addition of 0.5 wt. % cyclic sulfone reduces the AC-IR in NMC811-Gr cells. However, the dQ/dV profiles in FIG. 1 are indicative of a unique SEI layer on the anode surface compared to comparative examples. The dQ/dV profile for EE1 demonstrates a reaction peak at 0.8 V, which is absent in cells with other electrolytes.

TABLE B

Initial Cell Data for NMC811/Gr cells

| Electrolyte | Formation Discharge Capacity (Ah) | AC-IR (m$\Omega$) |
|---|---|---|
| CE1 | 1.77 | 13.15 |
| CE2 | 1.77 | 13.40 |
| EE1 | 1.78 | 12.90 |

The cells were then subjected to a high temperature storage test. The cells were charged to 100% state-of-charge at 4.2 V and placed in an environmental chamber set to 60° C. Every two weeks, the AC-IR, thickness, and capacity recovery of the cells was measured. The results are summarized in Table C. As can be seen in Table C, all cells demonstrated an increase in internal resistance, some swelling attributable to gas generation and loss of capacity. However, the embodiment example EE1 has lowest increase in AC-IR and the increase in cell thickness is significantly lower than CE1.

TABLE C

Storage Data in NMC811/Gr cells

| Electrolyte | AC-IR (%) | | Cell Thickness (%) | | Capacity Recovery (%) | |
|---|---|---|---|---|---|---|
| | Week 0 | Week 8 | Week 0 | Week 8 | Week 0 | Week 8 |
| CE1 | 100.0 | 207.8 | 100.0 | 122.1 | 100.0 | 80.6 |
| CE2 | 100.0 | 185.9 | 100.0 | 110.3 | 100.0 | 84.4 |
| EE1 | 100.0 | 181.3 | 100.0 | 111.9 | 100.0 | 77.6 |

Figure 2:
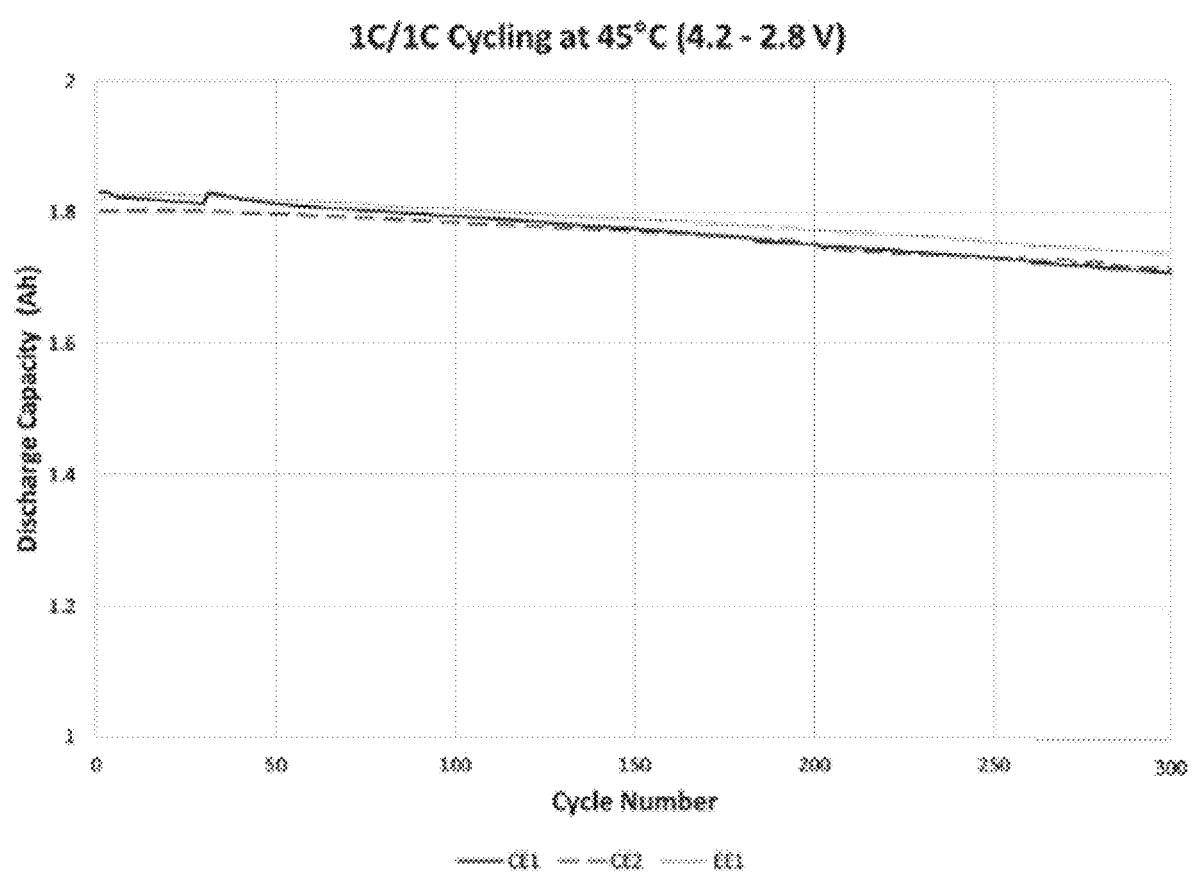
FIG. 2 shows the elevated temperature (45° C.) cycle life characteristics of electrolytes tested in NMC811/Gr cells in accordance to the present disclosure.

FIG. 2 shows the cycle life characteristics of 1.8 Ah NMC811/Gr cells at 45° C. during cycling at 1 C rate for charging and discharging. Here, it is clear that addition of cyclic sulfone additive does not lower the cyclability of NMC811/Gr cells. The capacity retention after 300 cycles is higher for cells with EE1 compared to CE1 and CE2. This data is summarized in Table D.

TABLE D

Data after 300 Cycles in NMC811/Gr cells

| Electrolyte | Retention (%) |
|---|---|
| CE1 | 93.3 |
| CE2 | 95.1 |
| EE1 | 95.5 |

Example 7—Electrolyte Formulations for LCO/Gr Cells

Electrolyte formulations were prepared in a dry argon filled glovebox by combining all electrolyte components in glass vials by stirring for 24 hours to ensure complete dissolution of all solids. The cyclic sulfone additive materials are added to a base electrolyte formulation comprising a 3:7 by volume mixture of ethylene carbonate, "EC", ethyl methyl carbonate, "EMC", and 1 M lithium hexafluorophosphate, "LiPF6", as a Li$^+$ ion conducting salt, dissolved therein. Vinylene carbonate "VC", 1,3 propane sultone "PaS" and 1,3,6 Hexanetricarbonitrile "HTCN" are used as anode and cathode additives in the comparative examples. The electrolyte formulations are listed in Table E.

TABLE E

Electrolyte Formulations used in LCO/Gr cells

| Electrolyte | Base Formulation | Additive Weight % |
|---|---|---|
| Comparative Example 3 (CE3) | 1.0M LiPF$_6$ in EC:EMC (3:7) | VC: 2%, |
| Comparative Example 3 (CE4) | 1.0M LiPF$_6$ in EC:EMC (3:7) | VC: 1%, PaS: 1%, HTCN: 1% |

TABLE E-continued

Electrolyte Formulations used in LCO/Gr cells

| Electrolyte | Base Formulation | Additive Weight % |
|---|---|---|
| Embodiment Example 2 (EE2) | 1.0M LiPF$_6$ in EC:EMC (3:7) | VC: 2%, Example 1: 0.5% |

Example 8—Electrochemical Cell Data for LCO/Gr Cells

Figure 3:
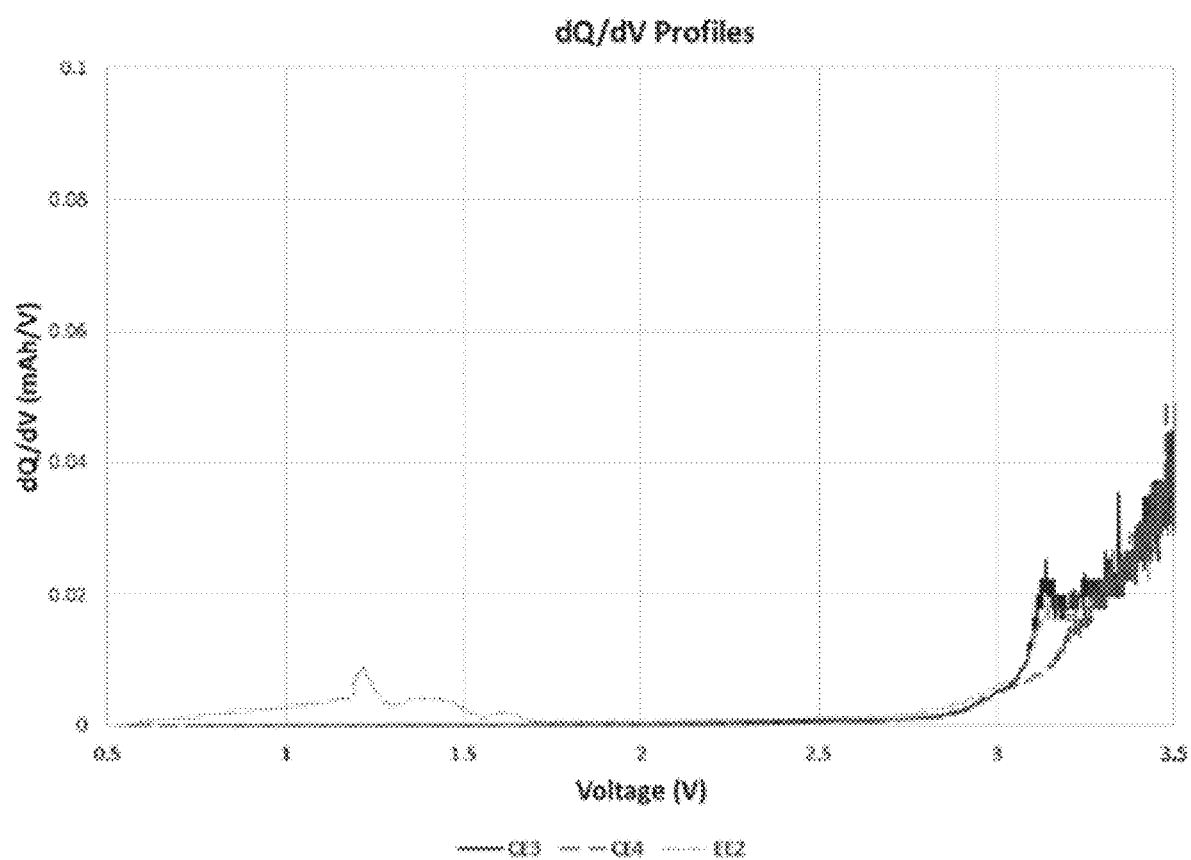
FIG. 3 is a graph showing the dQ/dV profiles of electrolytes tested in LCO/Gr cells in accordance with the present disclosure.

The electrolyte formulations prepared are used as electrolytes in 200 mAh Li-ion pouch cells comprising lithium cobalt oxide (LCO) cathode active material and graphite as the anode active material. In each cell, 0.9 mL of electrolyte formulation was added and allowed to soak in the cell for 1 hour. The cells are vacuum sealed, and primary charged before wetting at 25° C. for 15 hours. The cells were then charged to 3.8 V at C/25 rate before degassing, followed by vacuum sealing. After degassing, the cells were charged and discharged twice between 4.45 to 3.0 V at C/10 rate, and the results are summarized in Table E. The reported discharge capacity is for the last cycle of formation at C/5 rate and AC-IR is the measured internal resistance at 1 kHz frequency. With addition of 0.5 wt. % cyclic sulfone additive, the initial cell data is very comparable to comparative examples as seen in Table F. In the dQ/dV profile in FIG. 3 however, an early reaction at 1.2 V is seen with the cyclic sulfone additive according to the present disclosure.

TABLE F

Initial Cell Data for LCO/Gr cells

| Electrolyte | Formation Discharge Capacity (mAh) | AC-IR (mΩ) |
|---|---|---|
| CE3 | 228.2 | 116.2 |
| CE4 | 225.7 | 120.9 |
| EE2 | 225.7 | 126.4 |

The cells were then subjected to a high temperature storage test. The cells were charged to 100% state-of-charge at 4.2 V and placed in an environmental chamber set to 60° C. Every two weeks, the AC-IR, thickness, and capacity recovery of the cells was measured. The results are summarized in Table G. Here, a dramatic reduction in gas generation is seen with the use of only 0.5 wt. % cyclic sulfone additive. The thickness values for EE2 are significantly lower compared to CE3 and CE4, thus proving the benefit of cyclic sulfone additives.

TABLE G

Storage Data in LCO/Gr cells

| Electrolyte | AC-IR (%) | | Cell Thickness (%) | | Capacity Recovery (%) | |
|---|---|---|---|---|---|---|
| | Week 0 | Week 6 | Week 0 | Week 6 | Week 0 | Week 6 |
| CE3 | 100.0 | 402.0 | 100.0 | 210.3 | 100.0 | 63.1 |
| CE4 | 100.0 | 415.2 | 100.0 | 312.2 | 100.0 | 43.6 |
| EE2 | 100.0 | 386.3 | 100.0 | 119.6 | 100.0 | 72.6 |

Figure 4:
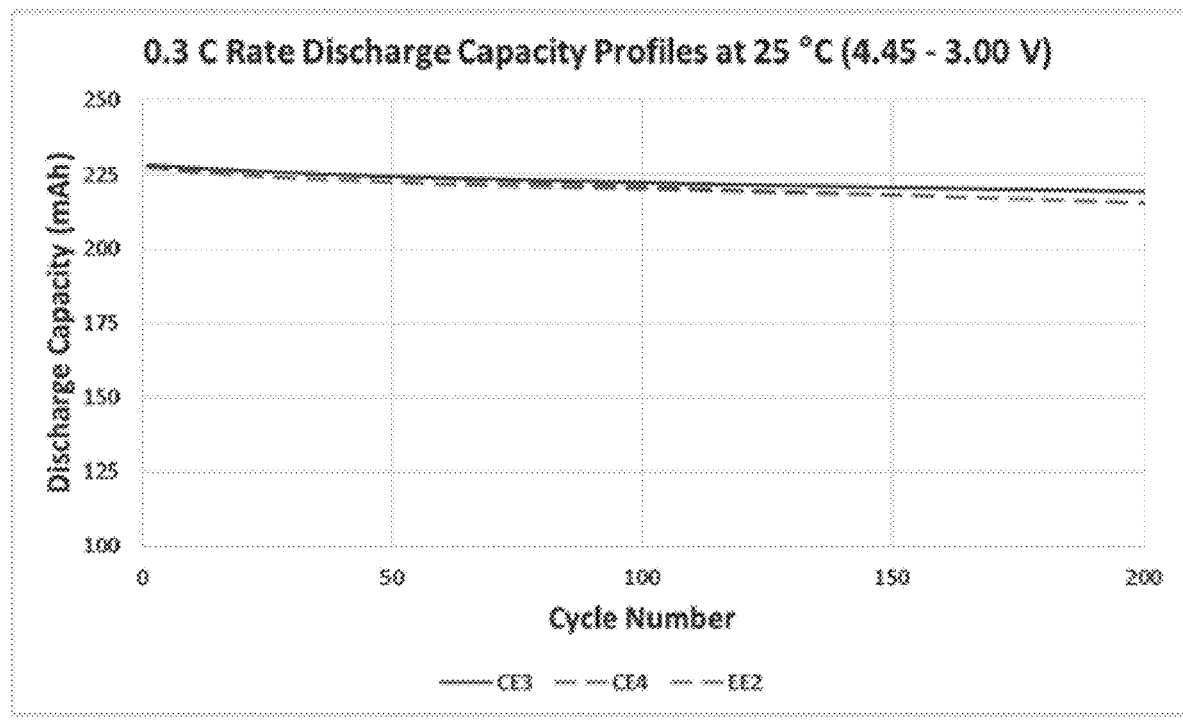
FIG. 4 shows the 25° C. cycle life characteristics of electrolytes tested in LCO/Gr cells in accordance to the present disclosure.

As seen by the data in FIG. 4, cells with EE2 show stable cycle life characteristics compared to cells with comparative examples. The capacity retention values for cells with all electrolytes is >95% after 150 cycles. This proves that cyclic sulfones do not negatively affect the room temperature performance of Li-ion batteries.

Example 9—Electrolytes for NMC811/SiOx Cells

The cyclic sulfone additive is added to a base electrolyte formulation comprising a 3:7 by weight mixture of ethylene carbonate, "EC" and ethyl methyl carbonate, "EMC", and 1 M lithium hexafluorophosphate, "LiPF6", as a Li+ ion conducting salt, dissolved therein. Comparative Example 5 (CE5) consists of the base formulation with vinylene carbonate "VC", fluoroethylene carbonate, and lithium difluorophosphate "LiPO$_2$F$_2$". Embodiment Example 3 (EE3) uses a representative example molecule as per the present disclosure in addition to FEC and LiPO$_2$F$_2$. The electrolyte components and additives used in are summarized in Table H.

TABLE H

Electrolyte Formulations for NMC811/SiOx cells

| Electrolyte | Base Formulation | Additive Weight % |
|---|---|---|
| Comparative Example 5 (CE5) | 1.0M LiPF$_6$ in EC:EMC (3:7) | FEC: 5% VC: 1%, LiPO$_2$F$_2$: 1% |
| Embodiment Example 3 (EE3) | 1.0M LiPF$_6$ in EC:EMC (3:7) | FEC: 5% LiPO$_2$F$_2$: 1% Example 3: 1% |

Example 10—Electrochemical Cell Data for NMC811/SiOx Cells

Figure 5:
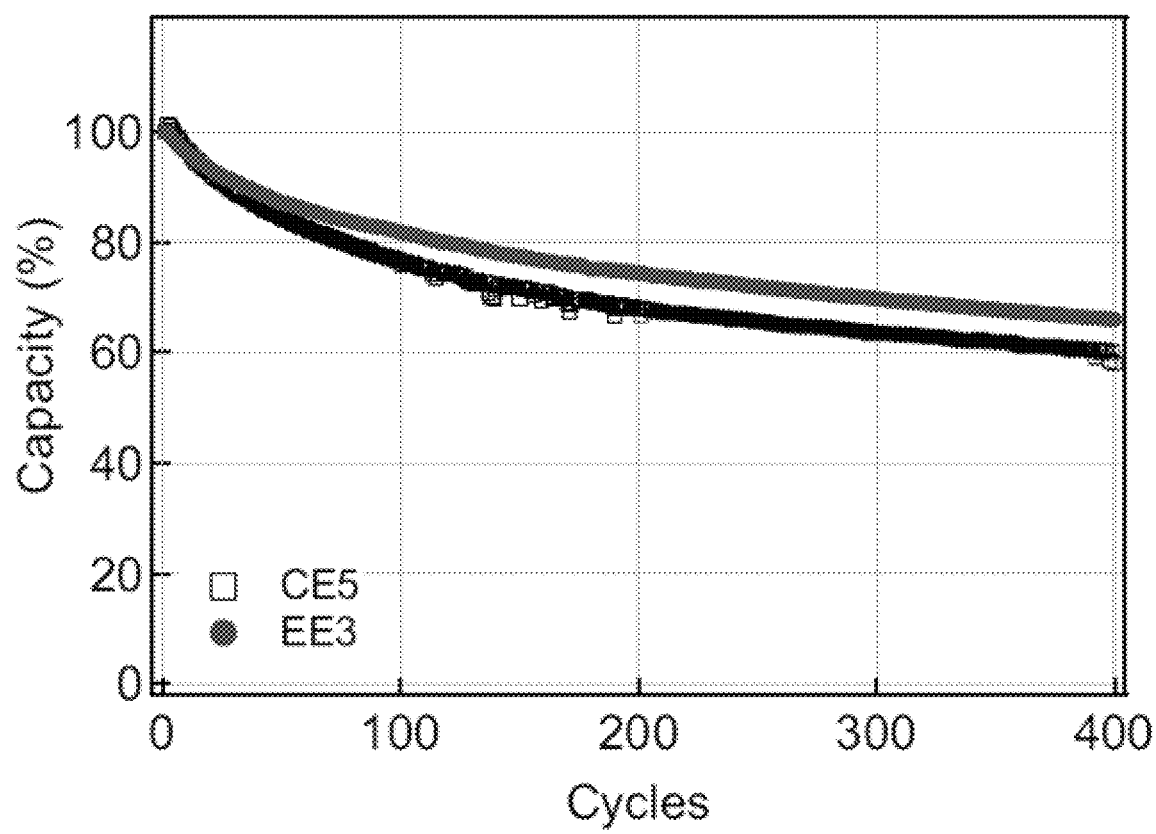
FIG. 5 shows the cycle life characteristics of 1.8 Ah NMC811/SiOx cells at 25° C. during cycling in accordance with the present disclosure.

The electrolyte formulations prepared are used as electrolytes in 1.8 Ah Li-ion pouch cells including NMC811 cathode active material and a 9:1 blend of artificial graphite and silicon oxides as the anode active material. The cell operation voltage window is 4.2-2.8 V. In each cell, 6 g of electrolyte was added and allowed to soak in the cell for 1 hour. The cells were vacuum sealed and allowed to rest at room temperature for 24 hours. The cells were then charged to 3.7 V at C/25 rate before degassing, followed by vacuum sealing. After degassing, the cells were charged and discharged twice between 4.2 to 2.8 V at C/10 rate, and then charged and discharged four hundred times between 4.2 to 2.8 V at 1 C rate at 25° C. FIG. 5 shows the cycle life characteristics of 1.8 Ah NMC811/SiOx cells at 25° C. during cycling at 1 C rate for charging and discharging. Here, it is clear that addition of a cyclic sulfone additive greatly improves the cyclability of NMC811/SiOx cells relative to the comparative example. The capacity retention after 400 cycles is higher for cells with EE3 compared to CE5. This data is summarized in Table I.

TABLE I

Data after 400 Cycles in NMC811/SiOx cells

| Electrolyte | Initial Capacity (Ah) | Retention (%) at 100 cycles | Retention (%) at 400 cycles |
|---|---|---|---|
| CE5 | 1.83 | 75.9 | 58.0 |
| EE5 | 1.84 | 81.7 | 66.0 |

Example 11—Electrolytes for NMC811/Gr Cells

The cyclic sulfone additive is added to a base electrolyte formulation comprising a 3:7 by weight mixture of ethylene carbonate, "EC" and ethyl methyl carbonate, "EMC", and 1 M lithium hexafluorophosphate, "LiPF6", as a Li+ ion conducting salt, dissolved therein. Comparative Example 101 (CE101) consists of the base formulation with vinylene carbonate "VC", and Comparative Example 102 (CE102) has 1,3-propane sultone "PaS" with VC. Embodiment Examples 101, 102 and 103 (EE101, EE102 and EE103) use a representative example molecule as per the present disclosure in addition to VC. The electrolyte components and additives are summarized in Table J.

TABLE J

Electrolyte Formulations for NMC811/Gr cells

| Electrolyte | Base Formulation | Additive Weight % |
|---|---|---|
| Comparative Example 101 (CE101) | 1.0M LiPF$_6$ in EC:EMC (3:7) | VC: 2% |
| Comparative Example 102 (CE102) | 1.0M LiPF$_6$ in EC:EMC (3:7) | VC: 2% PaS: 0.5% |
| Embodiment Example 101 (EE101) | 1.0M LiPF$_6$ in EC:EMC (3:7) | VC: 2% Example 1: 0.5% |
| Embodiment Example 102 (EE102) | 1.0M LiPF$_6$ in EC:EMC (3:7) | VC: 2% Example 3: 0.5% |
| Embodiment Example 103 (EE103) | 1.0M LiPF$_6$ in EC:EMC (3:7) | VC: 2% Example 2: 0.5% |

Example 12—Electrochemical Cell Data for NMC811/Gr Cells

Figure 6:
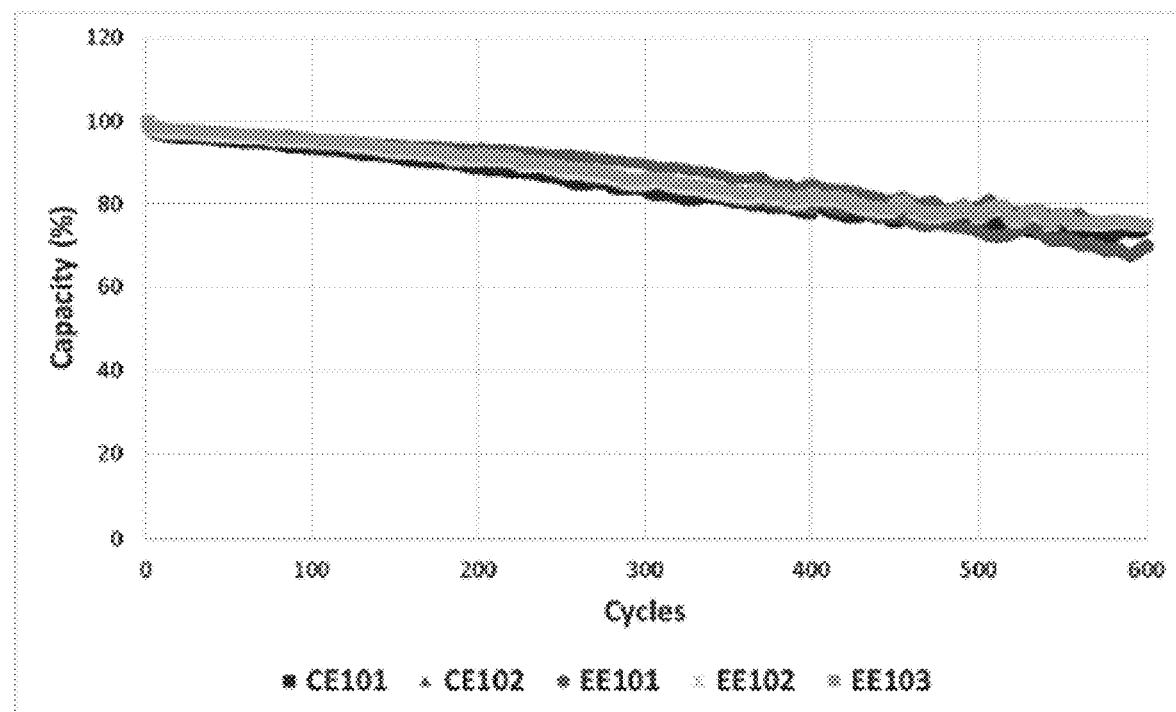
FIG. 6 shows the cycle life characteristics of 5.0 Ah NMC811/Gr cells at 45° C. during cycling in accordance to the present disclosure.

The formulations prepared are used as electrolytes in 5.0 Ah Li-ion pouch cells including NMC811 cathode active material and graphite as the anode active material. The cell operation voltage window is 4.2-2.8 V. In each cell, 15 g of electrolyte was added and allowed to soak in the cell for 1 hour. After sealing, the cells were charged to 3.7 V at C/25 rate before degassing, followed by vacuum sealing. After degassing, the cells were charged and discharged twice between 4.2 to 2.8 V at C/10 rate, and then charged and discharged six hundred times between 4.2 to 2.8 V at 0.5 C rate at 25° C. or subjected to a high temperature storage test. FIG. 6 shows the cycle life characteristics of 5.0 Ah NMC811/Gr cells at 45° C. during cycling at 0.5 C rate for charging and discharging. The capacity retention of cells with embodiment examples is comparable to that of cells with CE101 and CE102 with ~75% retention after 600 cycles. The cells subjected to a high temperature storage test were charged to 100% state-of-charge at 4.2 V and placed in an environmental chamber set to 60° C. Every two weeks, the AC-IR, thickness, and capacity recovery of the cells was measured. The results are summarized in Table K. As can be seen in Table K, all cells demonstrated an increase in internal resistance, some swelling attributable to gas generation and loss of capacity. However, the embodiment examples have low increase in AC-IR and the increase in cell thickness is significantly lower than CE101.

TABLE K

Storage Data for 5.0 Ah NMC811/Gr cells

| Electrolyte | AC-IR (%) | | Cell Thickness (%) | | Capacity Recovery (%) | |
|---|---|---|---|---|---|---|
| | Week 0 | Week 10 | Week 0 | Week 10 | Week 0 | Week 10 |
| CE101 | 100.0 | 245.3 | 100.0 | 124.3 | 100.0 | 45.2 |
| CE102 | 100.0 | 200.8 | 100.0 | 124.8 | 100.0 | 53.5 |

TABLE K-continued

Storage Data for 5.0 Ah NMC811/Gr cells

| Electrolyte | AC-IR (%) | | Cell Thickness (%) | | Capacity Recovery (%) | |
|---|---|---|---|---|---|---|
| | Week 0 | Week 10 | Week 0 | Week 10 | Week 0 | Week 10 |
| EE101 | 100.0 | 250.0 | 100.0 | 116.5 | 100.0 | 48.4 |
| EE102 | 100.0 | 243.2 | 100.0 | 116.1 | 100.0 | 45.8 |
| EE103 | 100.0 | 238.7 | 100.0 | 115.5 | 100.0 | 43.6 |

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. An electrochemical energy storage device comprising:
a cathode;
an anode;
an electrolyte comprising an aprotic organic solvent system, a metal salt, and at least one cyclic sulfone organic compound additive according to the molecular structure below:

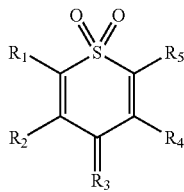

wherein: $R_3$ is an electron withdrawing group, or a $C_1$-$C_{12}$ linear or branched, alkyl group where at least one hydrogen is substituted with an electron withdrawing group; and $R_1$, $R_2$, $R_4$, $R_5$ are each independently hydrogen, $C_1$-$C_{12}$ linear or branched, substituted or unsubstituted alkyl and fluoroalkyl groups, or $C_6$-$C_{14}$ aryl groups wherein the hydrogen atoms can be unsubstituted or can be a halogen, alkyl, alkoxy, perfluorinated alkyl, silyl, siloxy, silane, sulfoxide, amide, azo, ether, and thioether group or combinations thereof; and
a separator.

2. The electrolyte of claim 1, wherein the electron withdrawing group is either a halogen, cyano, carbonyl, sulfonyl, nitro, or haloalkyl group.

3. The electrolyte of claim 1, wherein the at least one cyclic sulfone organic compound additive is at least one of 4H-1,1-dioxo-2,6-(phenyl)-4-(dicyanomethylidene)thiopyran; 4H-1,1-dioxo-2,6-(4-fuorophenyl)-4-(dicyanomethylidene)thiopyran; 4H-1,1-dioxo-2-phenyl-6-(4-methylphenyl)-4-(dicyanomethylidene)thiopyran; 4H-1,1-dioxo-2,6-di(4-trifuoromethylphenyl)-4-(dicyanomethylidene)thiopyran; and 4H-1,1-dioxo-2,6-di(2-thienyl)-4-(dicyanomethylidene)thiopyran.

4. The electrolyte of claim 1, wherein the at least one cyclic sulfone organic compound additive is present in a concentration of from 0.01 wt. % to 10 wt. % in the electrolyte.

5. The device of claim 1, wherein the aprotic organic solvent system comprises an open-chain or cyclic carbonate, carboxylic acid ester, nitrite, ether, sulfone, ketone, lactone, dioxolane, glyme, crown ether, siloxane, phosphoric acid ester, phosphite, mono- or polyphosphazene or mixture thereof.

6. The device of claim 1, wherein the aprotic organic solvent system is present in a concentration of from 60 wt. % to 90 wt. % in the electrolyte.

7. The device of claim 1, wherein the cation of the metal salt is an alkali metal.

8. The device of claim 7, wherein the alkali metal is lithium or sodium.

9. The device of claim 1, wherein the cation of the metal salt is aluminum or magnesium.

10. The device of claim 1, wherein the metal salt is present in a concentration of from 10 wt. % to 30 wt. % in the electrolyte.

11. The device of claim 1, wherein the electrolyte further comprises at least one additional additive.

12. The device of claim 11, wherein the at least one additional additive comprises a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or mixture thereof.

13. The device of claim 11, wherein the at least one additional additive comprises a partially or fully halogenated phosphoric acid ester compound, an ionic liquid, (methylsulfonyl)cyclotriphosphazene, or mixture thereof.

14. The device of claim 13, wherein the halogenated phosphoric acid ester compound is 4-fluorophenyldiphenylphosphate, 3,5-difluorophenyldiphenylphosphate, 4-chlorophenyldiphenylphosphate, trifluorophenylphosphate, heptafluorobutyldiphenylphosphate, trifluoroethyldiphenylphosphate, bis(trifluoroethyl)phenylphosphate, or phenylbis(trifluoroethyl)phosphate.

15. The device of claim 13, wherein the ionic liquid is tris(N-ethyl-N-methylpyrrolidinium)thiophosphate bis(trifluoromethylsulfonyl)imide, tris(N-ethyl-N-methylpyrrolidinium) phosphate bis(trifluoromethylsulfonyl)imide, tris(N-ethyl-N-methylpiperidinium)thiophosphate bis(trifluoromethylsulfonyl)imide, tris(N-ethyl-N-methylpiperidinium)phosphate bis(trifluoromethylsulfonyl)imide, N-methyl-trimethylsilylpyrrolidinium bis(trifluoromethylsulfonyl)imide, or N-methyl-trimethylsilylpyrrolidinium hexafluorophosphate.

16. The device of claim 11, wherein the at least one additional additive is present in a concentration of from 0.01 wt. % to 10 wt. % in the electrolyte.

17. The device of claim 1, wherein the cathode comprises a lithium metal oxide, spinel, olivine, carbon-coated olivine, vanadium oxide, lithium peroxide, sulfur, polysulfide, a lithium carbon monofluoride or mixture thereof.

18. The device of claim 1, wherein the lithium metal oxide is $LiCoO_2$, $LiNiO_2$, $LiNi_xCo_yMet_zO_2$, $LiMn_{0.5}Ni_{0.5}O_2$, $LiMn_{0.1}Co_{0.1}Ni_{0.8}O_2$, $LiMn_{0.2}Co_{0.2}Ni_{0.6}O_2$, $LiMnO_3Co_{0.2}Ni_{0.5}O_2$, $LiMn_{0.33}Co_{0.33}Ni_{0.33}O_2$, $LiMn_2O_4$, $LiFeO_2$, $Li_{1+x}Ni_\alpha Mn_\beta Co_\gamma Met'_\delta O_{2-z}F_z$, or $A_nB_2(XO_4)_3$, wherein Met is Al, Mg, Ti, B, Ga, Si, Mn or Co; Met' is Mg, Zn, Al, Ga, B, Zr or Ti; A is Li, Ag, Cu, Na, Mn, Fe, Co, Ni, Cu or Zn; B is Ti, V, Cr, Fe or Zr; X is P, S, Si, W or Mo; and wherein $0 \le x \le 0.3$, $0 \le y \le 0.5$, $0 \le z \le 0.5$, $0 \le x' \le 0.4$, $0 \le \alpha \le 1$, $0 \le \beta \le 1$, $0 \le \gamma \le 1$, $0 \le \delta \le 0.4$, $0 \le z' \le 0.4$ and $0 \le h' \le 3$; and the olivine cathode is $LiFePO_4$.

19. The device of claim 1, wherein the anode comprises lithium metal, graphitic material, amorphous carbon, $Li_4Ti_5O_{12}$, tin alloy, silicon, silicon alloy, intermetallic compound, or mixture thereof.

20. The device of claim 1, wherein the device comprises a lithium battery, lithium-ion battery, lithium-sulfur battery, lithium-air battery, sodium ion battery, magnesium battery, lithium/$MnO_2$ battery, or Li/poly(carbon monofluoride) battery.

21. The device of claim 1, wherein the device comprises a capacitor or solar cell.

22. The device of claim 1, wherein the device comprises an electrochemical cell.

23. The device of claim 1, wherein the separator comprises a porous separator separating the anode and cathode from each other.

24. The device of claim 23, wherein the porous separator comprises an electron beam-treated micro-porous polyolefin separator or a microporous polymer film comprising nylon, cellulose, nitrocellulose, polysulfone, polyacrylonitrile, polyvinylidene fluoride, polypropylene, polyethylene, polybutene, or co-polymer or blend of any two or more such polymers.

* * * * *